(12) United States Patent
Saito

(10) Patent No.: US 8,529,044 B2
(45) Date of Patent: Sep. 10, 2013

(54) INK COMPOSITION, INK SET, AND METHOD OF FORMING IMAGE

(75) Inventor: Ryo Saito, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 239 days.

(21) Appl. No.: 12/858,449

(22) Filed: Aug. 18, 2010

(65) Prior Publication Data
US 2011/0057982 A1  Mar. 10, 2011

(30) Foreign Application Priority Data

Sep. 4, 2009  (JP) .................................. 2009-204658

(51) Int. Cl.
*B41J 2/01* (2006.01)
(52) U.S. Cl.
USPC ........................................... 347/100; 347/95
(58) Field of Classification Search
USPC ............... 347/100, 95, 96, 101, 21, 20, 9, 88, 347/99; 106/31.13, 31.27, 31.6; 523/160, 523/161
See application file for complete search history.

(56) References Cited

U.S. PATENT DOCUMENTS

| | | | | |
|---|---|---|---|---|
| 2010/0249284 A1* | 9/2010 | Saito et al. | ....................... | 524/90 |
| 2011/0043566 A1* | 2/2011 | Saito | ............................... | 347/20 |

FOREIGN PATENT DOCUMENTS

| | | |
|---|---|---|
| JP | 2003-138176 | 5/2003 |
| JP | 2004-074434 | 3/2004 |
| JP | 2007-314784 A | 12/2007 |
| JP | 2008-230161 | 10/2008 |
| JP | 2009-000890 | 1/2009 |
| JP | 2009-084501 A | 4/2009 |
| JP | 2009084501 A * | 4/2009 |
| WO | WO 2007126145 A2 * | 11/2007 |

OTHER PUBLICATIONS

English language translation of the following: Office action dated Jun. 4, 2013 from the JPO in a Japanese patent application corresponding to the instant patent application. This office action translation is submitted now in order to supplement the understanding of patent document JP2003-138176, JP2008-230161, JP2009-000890 and JP2004-074434 which are cited in the office action and are being disclosed in the instant Information Disclosure Statement.

\* cited by examiner

*Primary Examiner* — Manish S Shah
(74) *Attorney, Agent, or Firm* — SOLARIS Intellectual Property Group, PLLC

(57) ABSTRACT

An ink composition includes: water-insoluble polymer particles having a colorant and a water-insoluble polymer; and a compound represented by the following Formula (A), wherein the content of free polymer derived from the water-insoluble polymer is 1.0% by mass or less with respect to the total mass of the ink composition:

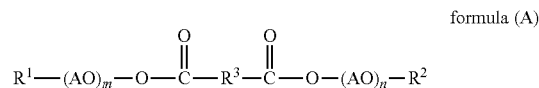

formula (A)

wherein, $R^1$ and $R^2$ each independently represent a hydrogen atom or a hydrocarbon group having 1 to 22 carbon atoms; $R^3$ represents a divalent hydrocarbon group having 1 to 18 carbon atoms; $R^1$ and $R^2$ may be the same as or different from each other, but $R^1$ and $R^2$ do not both represent a hydrogen atom at the same time; $R^1$ to $R^3$ may each have a substituent; m and n each independently represent an average addition mole number of AO of from 0 to 30; and AO represents an alkylene oxy group.

8 Claims, 2 Drawing Sheets

INK COMPOSITION, INK SET, AND METHOD OF FORMING IMAGE

CROSS-REFERENCE TO RELATED APPLICATION

This application claims priority under 35 USC 119 from Japanese Patent Application No. 2009-204658, filed on Sep. 4, 2009, the disclosure of which is incorporated by reference herein.

BACKGROUND OF THE INVENTION

1. Field of Invention

The invention relates to an ink composition, an ink set and an image formation method.

2. Description of the Related Art

In view of recent demand for high-speed printing, an ink jet recording apparatus equipped with a line head, which includes a large number of nozzles formed in lines such that the width of the line head is the same as the width of a sheet of a certain size, has been proposed.

In a liquid jetting apparatus including a line head, the head does not perform scanning. Therefore, if some of the large number of nozzles arranged in lines are clogged, it is not possible to perform supplemental printing with other nozzles that are not clogged. Accordingly, in such a liquid jetting device having a line head, there is demand for ink that causes less nozzle clogging, as well as need for new countermeasures for preventing nozzle clogging.

In this regard, a water-based ink which provides excellent image clarity and excellent print density, which contains a water-insoluble polymer containing a pigment, and in which the content of free polymer derived from the water-insoluble polymer is 0.40% by weight or less, has been disclosed (see, for example, Japanese Patent Application Laid-Open (JP-A) No. 2009-084501).

Furthermore, an aqueous dispersion for inkjet recording which contains a water-insoluble organic compound and crosslinked water-insoluble polymer particles containing a colorant has been disclosed as a water-based ink having excellent glossiness and excellent storage stability (see, for example, JP-A No. 2007-314784). In the water dispersion, the crosslinked water-insoluble polymer particles are obtained by crosslinking a water-insoluble polymer using a crosslinking agent.

SUMMARY OF THE INVENTION

However, there remain problems in terms of the ink disclosed in JP-A No. 2009-084501 tending to easily adhere onto a nozzle member because the polymer included in the ink is insoluble in water, and the ink tending to be foamy owing to the polymer structure.

In particular, when the ink is used in a line-head inkjet recording apparatus, there is significant clogging of nozzles, and it is difficult to remove the clogging by standard maintenance because of the adherence of the ink.

The ink disclosed in JP-A No. 2007-314784 tends to easily adhere onto a nozzle member because the polymer included in the ink is insoluble in water. The presence of a free polymer further increases the tendency for the ink to adhere onto a nozzle member, and also increases the tendency for the ink to foam.

In recent line-head inkjet recording, in particular, the problem of nozzle clogging has arisen, and the difficulty of removing the clogging during maintenance has also been problematic. Even when the inks disclosed in JP-A No. 2009-084501 and 2007-314784 are used, jetting stability and ink removal during maintenance were not sufficient.

The present invention has been made in view of the above circumstances and provides an ink composition, an ink set and an image formation method.

According to a first aspect of the invention, there is provided an ink composition, including:

water-insoluble polymer particles comprising a colorant and a water-insoluble polymer; and a compound represented by the following Formula (A), wherein the content of free polymer derived from the water-insoluble polymer is 1.0% by mass or less with respect to the total mass of the ink composition:

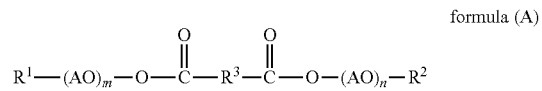

formula (A)

wherein, $R^1$ and $R^2$ each independently represent a hydrogen atom or a hydrocarbon group having 1 to 22 carbon atoms; $R^3$ represents a divalent hydrocarbon group having 1 to 18 carbon atoms; $R^1$ and $R^2$ may be the same as or different from each other, but $R^1$ and $R^2$ do not both represent a hydrogen atom at the same time; $R^1$ to $R^3$ may each have a substituent; m and n each independently represent an average addition mole number of AO of from 0 to 30; and AO represents an alkylene oxy group.

According to a second aspect of the invention, there is provided an ink set comprising the ink composition according to the first aspect of the invention.

According to a third aspect of the invention, there is provided an image formation method comprising forming an image by jetting the ink composition according to the first aspect of the invention from plural jetting ports that are arranged in a two-dimensional matrix.

DETAILED DESCRIPTION OF THE INVENTION

Ink Composition

Figure 1:
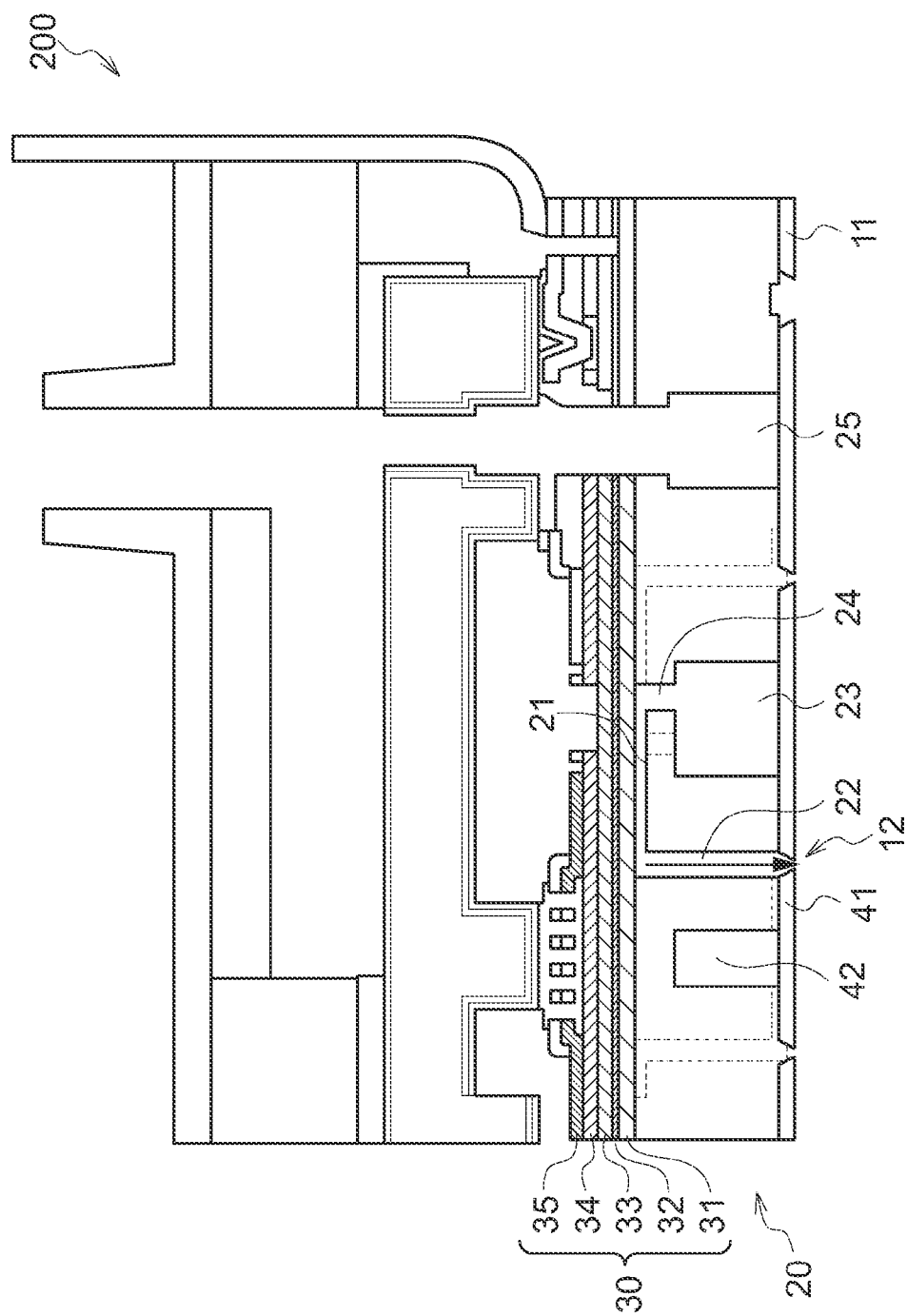
FIG. 1 is a cross-sectional view schematically showing an example of the internal configuration of an inkjet head.

According to an embodiment of the invention, the ink composition includes: water-insoluble polymer particles including a colorant and a water-insoluble polymer; and a compound represented by the below-described formula (A), in which the content of free polymer derived from the water-insoluble polymer is 1.0% by mass or less with respect to the total mass of the ink composition.

Since the ink composition of the invention has the above configuration in which, especially, the compound represented by formula (A) shown below is contained and the content of free polymer is 1.0% by mass or less, excellent jetting stability and excellent ink removability are achieved.

In the invention, the term "free polymer" is a generic term of which the scope includes a polymer that is not adsorbed to the colorant, a polymer particle not containing the colorant, an easily detachable polymer such as a polymer which is adsorbed to the colorant so weakly as to be easily liberated therefrom by other components of the ink, and the like.

Meanwhile, a polymer that directly contributes to the dispersion of the colorant in the ink composition is called "polymer adsorbed to the colorant" or "adsorbed polymer".

When an ink composition is prepared using a pigment dispersion, a water-soluble organic solvent and the like as described below are added. Since the solvent of the ink composition is different in solvent composition of medium from the solvent of the pigment dispersion, which mainly contains water, the ink composition tends to be hydrophobic as compared with a case where water is used as the only solvent. As a result, the polymer adsorbed onto a colorant tends to liberate therefrom. The inventors of the present invention have found that the free polymer present in an ink composition is a factor that affects the jetting stability, ink removability, long-term storage stability, jetting stability after long-term storage, and the like. Thus, the calculation of the amount of free polymer present in the ink composition of the invention should be based on the measurement using the ink composition itself.

The content of free polymer present in the ink composition of the invention is set to be 1.0% by mass or less from the viewpoint of improving jetting stability and ink removability.

When the content of free polymer present in the ink composition exceeds 1.0% by mass, the amount of the ink composition that adheres to an inkjet nozzle member increases and the ink composition may clog the nozzle, leading to difficulty in jetting the ink composition. Moreover, since the ink composition adheres to the nozzle member, the ink composition is hardly removed even by washing.

The content of free polymer in the ink composition of the invention is preferably 0.75% by mass or less, more preferably 0.40% by mass or less, and furthermore preferably 0.30% by mass or less, and it is most preferable that no free polymer is present (i.e., the content of free polymer is 0% by mass). A content of free polymer of 0.40% by mass or less is preferable because the jetting stability and ink removability is further improved, and stable jetting of the ink can be achieved even after long-term storage. The content of free polymer may be measured by the method described in the Examples section of the present specification.

As for the content of free polymer in the ink composition, a value obtained as described below is used.

The ink composition is centrifuged using a high-speed ultracentrifuge (trade name: OPTIMA XL100K, manufactured by Beckman Coulter, Inc.) at 80,000 rpm for 1 hour to precipitate colorant-containing polymer particles, and the resultant supernatant is collected. Then, the amount of water-insoluble polymer contained in the collected supernatant is determined using a nuclear magnetic resonance analyzer (trade name: INOVA 400 ($^{13}$C-NMR), manufactured by Varian Technologies Japan Limited). A standard curve is made based on measurement results at three different concentrations, using a standard sample of colorant-containing polymer particles.

The mass ratio of the amount of free polymer to the amount of adsorbed polymer (i.e., free polymer/adsorbed polymer) is preferably 0.23 or less, more preferably 0.20 or less, and furthermore preferably 0.15 or less, from the viewpoints of improving jetting stability and ink removability, and from the viewpoint that the ink is stably jetted even after long-term storage.

The total content (i.e., total amount of solid contents) of the colorant, adsorbed polymer, and free polymer in the ink composition is preferably from 1.5 to 10.0% by mass, more preferably from 2.5 to 8.0% by mass, and furthermore preferably from 3.0 to 7.5% by mass, from the viewpoints of improving jetting stability and ink removability.

The amount of solid contents may be determined by the method described in the Examples section of the present specification.

Colorant

The colorant in the ink composition according to the invention is included in the water-insoluble polymer particles.

The colorant used in the invention is not particularly limited, and examples thereof include pigments, hydrophobic dyes (such as oil-soluble dyes or disperse dyes), and water-soluble dyes (such as acid dyes, reactive dyes or direct dyes). From the viewpoint of water resistance, storage stability and abrasion resistance, a pigment and a hydrophobic dye are preferred. In particular, in view of achieving high weather resistance, which is an increasingly desired property in these days, a pigment is preferably used.

When used in the ink composition, the pigment or the hydrophobic dye needs to be formed into particles that are stable in the ink, with the use of a surfactant or a polymer. In particular, from the viewpoint of dispersibility or the like, it is preferred to include the pigment and/or the hydrophobic dye in polymer particles.

The pigment may be either an inorganic pigment or an organic pigment. If necessary, these pigments may be used in combination with an extender pigment.

Pigment

In the ink composition according to the invention, the pigment is preferably included in the water-insoluble polymer particles from the viewpoint of dispersion stability, jetting stability or the like.

The pigment may be either an inorganic pigment or an organic pigment. If necessary, these pigments may be used in combination with an extender pigment.

Examples of the inorganic pigment include carbon black, metal oxides, metal sulfides and metal chlorides. Among these, particularly in black aqueous inks, carbon black is preferred. Examples of the carbon black include furnace black, thermal lamp black, acetylene black and channel black.

Examples of the organic pigment include azo pigments, disazo pigments, phthalocyanine pigments, quinacridone pigments, isoindolinone pigments, dioxazine pigments, perylene pigments, perinone pigments, thioindigo pigments, anthraquinone pigments and quinophthalone pigments.

The color hue of the organic pigment is not particularly limited, and those having a chromatic color such as red organic pigments, yellow organic pigments, blue organic pigments, orange organic pigments or green organic pigments.

Specific examples of preferred organic pigments include products with the following product numbers: C. I. Pigment Yellow 13, 17, 74, 83, 97, 109, 110, 120, 128, 139, 151, 154, 155, 174 and 180; C. I. Pigment Red 48, 57:1, 122, 146, 176, 184, 185, 188 and 202; C. I. Pigment Violet 19 and 23; C. I. Pigment Blue 15, 15:1, 15:2, 15:3, 15:4, 16 and 60; and C. I. Pigment Green 7 and 36.

Examples of the extender pigments include silica, calcium carbonate and talc.

The hydrophobic dye is not particularly limited as long as it can be included in cross-linked polymer particles. The oil-soluble dye that dissolves in an organic solvent used for the production of polymer (preferably methyl ethyl ketone) in an amount of 2 g/L or more, and preferably from 20 to 500 g/L (25° C.) with respect to the organic solvent, is preferably used from the viewpoint of efficiently including the dye in the polymer.

Examples of the hydrophobic dyes include oil-soluble dyes and disperse dyes, among which oil-soluble dyes are preferred.

Examples of the oil-soluble dyes include products with the following product numbers: C. I. Solvent Black, C. I. Solvent Yellow, C. I. Solvent Red, C. I. Solvent Violet, C. I. Solvent Blue, C. I. Solvent Green and C. I. Solvent Orange. These products are available from Orient Chemical Industries, Co., Ltd., BASF Japan Ltd., and the like.

Examples of the disperse dyes include products with the following product numbers: C. I. Disperse Yellow, C. I. Disperse Orange, C. I. Disperse Red, C. I. Disperse Violet, C. I. Disperse Blue and C. I. Disperse Green. Among these, preferred yellow dyes are C. I. Solvent Yellow 29 and 30, preferred cyan dye is C. I. Solvent Blue 70, preferred magenta dyes are C. I. Solvent Red 18 and 49, and preferred black dyes are C. I. Solvent Black 3 and 7, and nigrosine black dyes.

These colorants may be used alone or in combination of two or more kinds thereof.

The mass ratio of the colorant and the water-insoluble polymer (water-insoluble polymer/colorant) is preferably from 10/90 to 90/10, more preferably from 20/80 to 80/20, and particularly preferably from 20/80 to 50/50, from the viewpoint of glossiness and storage stability.

In the ink composition according to the invention, from the viewpoint of improving print density and dispersion stability, the mass ratio of the colorant (in particular, a pigment) to the water-insoluble polymer (colorant/water-insoluble polymer) is preferably from 50/50 to 90/10, and more preferably from 50/50 to 80/20, in terms of calculated values based on the addition amounts thereof.

Further, from the viewpoint of reducing the amount of solid content as much as possible, as well as improving print density and dispersion stability, the mass ratio of the polymer that directly contributes to dispersion of the colorant in the ink composition by adsorbing to the colorant (hereinafter, also referred to as "polymer adsorbed to the colorant" or simply referred to as "adsorbed polymer") with respect to the colorant (adsorbed polymer/colorant) is preferably from 0.1 to 0.75, more preferably from 0.1 to 0.55, further preferably from 0.15 to 0.55, and particularly preferably from 0.15 to 0.45. The amount of adsorbed polymer is, as described in the examples, a value of subtracting the amount of free polymer from the amount of water-insoluble polymer in the ink composition.

The content of colorant in the ink composition according to the invention is 2% by mass or more, preferably from 2 to 4.8% by mass, more preferably from 2 to 4.5% by mass, further preferably from 2.5 to 4.5% by mass, from the viewpoint of improving print density.

Water-Insoluble Polymer Particles

The water-insoluble polymer particles used in the invention include at least one colorant and a water-insoluble polymer.

Examples of the water-insoluble polymer include a water-insoluble vinyl polymer, a water-insoluble ester polymer and a water-insoluble urethane polymer. Among these, from the viewpoint of stability of an aqueous dispersion, a water-insoluble vinyl polymer is preferred. In the present specification, the term "water-insoluble polymer" refers to a polymer of which solubility (dissolution amount) in 100 g of water at 25° C. is 10 g or less, preferably 5 g or less, and further preferably 1 g or less, after being dried at 105° C. for 2 hours.

When the water-insoluble polymer has a salt-forming group, the dissolution amount of water-insoluble polymer refers to the dissolution amount of the water-insoluble polymer of which salt-forming group has been neutralized to 100% with acetic acid or sodium hydroxide depending on the type of the salt-forming group.

When the colorant is a pigment, the colorant in the ink composition according to the invention is preferably contained in the water-insoluble polymer particles, in view of dispersion stability, water resistance, jettability, print density or the like.

In order to provide jetting stability and removability, the water-insoluble polymer is preferably a polymer that includes at least a structural unit derived from a monomer having a salt-forming group (a), and a structural unit derived from a styrenic macromer (b) and/or a structural unit derived from a hydrophobic monomer (c). More preferably, the water-insoluble polymer is a water-insoluble graft polymer that includes a structural unit derived from a monomer having a salt-forming group (a) and a structural unit derived from a styrenic macromer (b).

The water-insoluble graft polymer preferably has a polymer including a structural unit derived from a monomer having a salt-forming group (a) and a structural unit derived from a hydrophobic monomer (c) in its main chain, and a structural unit derived from a styrenic macromer (b) in its side chain.

The water-insoluble polymer as described above is preferably a water-insoluble vinyl polymer formed by copolymerizing a mixture of monomers that include a monomer having a salt-forming group (a) (hereinafter, also referred to as "component (a)"), a styrenic macromer (b) (hereinafter, also referred to as "component (b)") and/or a hydrophobic monomer (c) (hereinafter, also referred to as "component (c)"). Hereinafter, this mixture of monomers is also referred to as "monomer mixture".

Monomer Having Salt-Forming Group (a)

The monomer having a salt-forming group (a) is used from the viewpoint of enhancing dispersion stability of the obtained dispersion, or the like. Examples of the salt-forming group include a carboxyl group, a sulfonic acid group, a phosphoric acid group, an amino group and an ammonium group.

Examples of the component (a) include cationic monomers and anionic monomers. Examples of the cationic monomers and anionic monomers include a compound such as those described in page 5, column 7, line 24 to column 8, line 29 of JP-A No. 9-286939.

Representative examples of the cationic monomers include unsaturated amino group-containing monomers and unsaturated ammonium salt-containing monomers. Among these, N,N-dimethylaminoethyl (meth)acrylate and N—(N',N'-dimethylaminopropyl) (meth)acrylamide are preferred.

Representative examples of the anionic monomers include unsaturated carboxylic acid monomers, unsaturated sulfonic acid monomers and unsaturated phosphoric acid monomers.

Examples of the unsaturated carboxylic acid monomers include acrylic acid, methacrylic acid, crotonic acid, itaconic acid, maleic acid, fumaric acid, citraconic acid and 2-methacryloyloxymethyl succinic acid.

Examples of the unsaturated sulfonic acid monomers include styrene sulfonic acid, 2-acrylamide-2-methylpropane sulfonic acid, 3-sulfopropyl (meth)acrylate and bis-(3-sulfopropyl)itaconate.

Examples of the unsaturated phosphoric acid monomers include vinyl phosphonic acid, vinyl phosphate, bis(methacryloyloxyethyl)phosphate, diphenyl-2-acryloyloxyethyl phosphate, diphenyl-2-methacryloyloxyethyl phosphate and dibutyl-2-acryloyloxyethyl phosphate.

Among the above anionic monomers, unsaturated carboxylic acid monomers are preferred, and acrylic acid or methacrylic acid is more preferred, in view of dispersion stability, jettability or the like.

Styrenic Macromer (b)

A styrenic macromer (b) (hereinafter, simply referred to as "macromer" or "component (b)" in some cases) is used from the viewpoint of, for example, enhancing dispersion stability of the water-insoluble polymer particles including a pigment by increasing its compatibility with the colorant (in particular, a pigment). Examples of the styrenic macromers (b) include a macromer that is a monomer having a number average molecular weight of from 500 to 100,000, preferably from 1,000 to 10,000, and having a polymerizable functional group, such as an unsaturated group, at one terminal thereof.

The number average molecular weight of the component (b) is measured by gel permeation chromatography using polystyrene as a standard substance, and tetrahydrofuran including 50 mmol/L acetic acid as a solvent.

The macromer as the component (b) preferably has a hydrophobic graft chain in view of enhancing the compatibility with the pigment.

"Styrenic macromer" as used herein refers to a macromer having a structural unit derived from a styrenic monomer such as styrene, α-methylstyrene, or vinyl toluene. Among these styrenic monomers, styrene is preferable.

Examples of the styrenic macromer include a styrene homopolymer having a polymerizable functional group at one terminal thereof, and a copolymer of a styrene monomer and another type of monomer, the copolymer having a polymerizable functional group at one terminal thereof. The polymerizable functional group present at one terminal of the homopolymer or copolymer is preferably an acryloyloxy group or a methacryloyloxy group. When copolymerization is carried out utilizing the functional group, water-insoluble graft polymers having a structural unit derived from the styrenic macromer can be obtained.

Examples of the another type of monomer that may be copolymerized with the styrenic monomer include (1) acrylonitrile, (2) (meth)acrylate esters described below (b-2 Monomer), and (3) (meth)acrylate monomers containing an aromatic ring other than styrene (b-3 Monomer).

In a side chain or in the styrenic macromer, the content of structural unit derived from the styrenic monomer is preferably 60% by mass or more, more preferably 70% by mass or more, and particularly preferably 90% by mass or more, from the viewpoint of pigment dispersibility.

Examples of commercially-available styrenic macromer include AS-6, AS-6S, AN-6, AN-6S, HS-6, and HS-6S (all trade names, manufactured by Toagosei Co., Ltd.).

Hydrophobic Monomer (c)

A hydrophobic monomer (c) is used from the viewpoint of improving dispersion stability of a water-resistant colorant, reducing the amount of free polymer, or the like, and examples thereof include alkyl (meth)acrylate, alkyl (meth)acrylamide, an aromatic ring-containing monomer, and a monomer capable of forming a repeating unit represented by the following Formula (1) or the following Formula (2).

Examples of the alkyl (meth)acrylate include (meth)acrylic acid esters having an alkyl group having 1 to 22 carbon atoms, such as methyl (meth)acrylate, ethyl (meth)acrylate, (iso)propyl (meth)acrylate, (iso or tertiary)butyl (meth)acrylate, (iso)amyl (meth)acrylate, cyclohexyl (meth)acrylate, 2-ethylhexyl (meth)acrylate, (iso)octyl (meth)acrylate, (iso)decyl (meth)acrylate, (iso)dodecyl (meth)acrylate or (iso)stearyl (meth)acrylate.

Examples of the alkyl (meth)acrylamide include (meth)acrylamides having an alkyl group having 1 to 22 carbon atoms, such as methyl (meth)acrylamide, dimethyl (meth)acrylamide, diethyl (meth)acrylamide, dibutyl (meth)acrylamide, t-butyl (meth)acrylamide, octyl (meth)acrylamide or dodecyl (meth)acrylamide.

Examples of the aromatic ring-containing monomers include styrenic monomers such as styrene, 2-methyl styrene or vinyl toluene, aryl esters of (meth)acrylic acid such as benzyl (meth)acrylate or phenoxyethyl (meth)acrylate, and vinyl monomers having an aromatic hydrocarbon group having 6 to 22 carbon atoms such as ethylvinylbenzene, 4-vinylbiphenyl, 1,1-diphenylethylene, vinylnaphthalene or chlorostyrene.

In the present specification, the expression "(iso or tertiary)" refers to iso or tertiary or normal, and "(iso)" refers to iso or normal. The expression "(meth)acrylate" encompasses both acrylate and methacrylate.

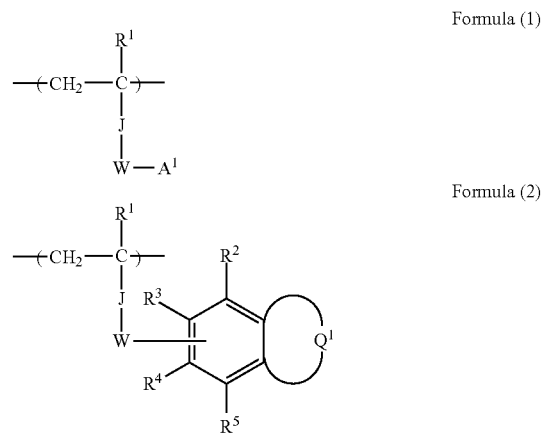

In Formula (1) and Formula (2), $R^1$ represents a hydrogen atom or a substituent. One of $R^2$ to $R^5$ represents a single bond to W, and the others each independently represent a hydrogen atom or a substituent. J represents *—CO—, *—COO—, *—CONR$^{10}$—, *—OCO—, a methylene group, a phenylene group or *—C$_6$H$_4$CO—. $R^{10}$ represents a hydrogen atom, an alkyl group, an aryl group or an aralkyl group. W represents a single bond or a divalent linking group. $A^1$ represents a hetero ring group. $Q^1$ represents a group of atoms that is necessary for forming a ring together with the carbon atoms. *— represents a bonding to the main chain.

Examples of the substituent represented by any of $R^1$ to $R^5$ include a monovalent substituent (hereinafter, referred to as Z). Examples of the monovalent substituent include an alkyl group (an alkyl group having preferably 1 to 30 carbon atoms, more preferably 1 to 20 carbon atoms, particularly preferably 1 to 10 carbon atoms, such as a methyl group, an ethyl group, an iso-propyl group, a tert-butyl group, an n-octyl group, an n-decyl group or an n-hexadecyl group), a cycloalkyl group (a cycloalkyl group having preferably 3 to 30 carbon atoms, more preferably 1 to 20 carbon atoms, particularly preferably 3 to 10 carbon atoms, such as a cyclopropyl group, a cyclopentyl group or a cyclohexyl group), an alkenyl group (an alkenyl group having preferably 2 to 30 carbon atoms, more preferably 2 to 20 carbon atoms, particularly preferably 2 to 10 carbon atoms, such as a vinyl group, an allyl group, a 2-butenyl group or a 3-pentenyl group), an alkynyl group (an alkynyl group having preferably 2 to 30 carbon atoms, more preferably 2 to 20 carbon atoms, particularly preferably 2 to 10 carbon atoms, such as a propargyl group or a 3-pentynyl group), an aryl group (an aryl group having preferably 6 to 30 carbon atoms, more preferably 6 to 20 carbon atoms, particularly preferably 6 to 12 carbon atoms, such as a phenyl group, a p-methylphenyl group, a naphthyl group or an anthranil group), an amino group (an amino group having preferably 0 to 30 carbon atoms, more preferably 0 to 20 carbon atoms, particularly preferably 0 to 10 carbon atoms, such as an amino group, a methylamino group, a dimethylamino group, a diethylamino group, a dibenzylamino group, a diphenylamino group or a ditolylamino group), an alkoxy group (an alkoxy group having preferably 1 to 30 carbon atoms, more preferably 1 to 20 carbon atoms, particularly preferably 1 to 10 carbon atoms, such as a methoxy group, an ethoxy group, a butoxy group or a 2-ethylhexyloxy group), an aryloxy group (an aryloxy group having preferably 6 to 30 carbon atoms, more preferably 6 to 20 carbon atoms, particularly preferably 6 to 12 carbon atoms, such as a phenyloxy group, a 1-naphthyloxy group or a 2-naphthyloxy group), a heterocyclic oxy group (a heterocyclic oxy group having preferably 1 to 30 carbon atoms, more preferably 1 to 20 carbon atoms, particularly preferably 1 to 12 carbon atoms, such as a pyridyloxy group, a pyrazyloxy group, a pyrimidyloxy group or a quinolyloxy group), an acyl group (an acyl group having preferably 1 to 30 carbon atoms, more preferably 1 to 20 carbon atoms, particularly preferably 1 to 12 carbon atoms, such as an acetyl group, a benzoyl group, a formyl group or a pivaloyl group), an alkoxycarbonyl group (an alkoxycarbonyl group having preferably 2 to 30 carbon atoms, more preferably 2 to 20 carbon atoms, particularly preferably 2 to 12 carbon atoms, such as a methoxycarbonyl group or an ethoxycarbonyl group), an aryloxycarbonyl group (an aryloxycarbonyl group having preferably 7 to 30 carbon atoms, more preferably 7 to 20 carbon atoms, particularly preferably 7 to 12 carbon atoms, such as a phenyloxycarbonyl group), an acyloxy group (an acyloxy group having preferably 1 to 30 carbon atoms, more preferably 1 to 20 carbon atoms, particularly preferably 1 to 10 carbon atoms, such as an acetoxy group or a benzoyloxy group), an acylamino group (an acylamino group having preferably 1 to 30 carbon atoms, more preferably 1 to 20 carbon atoms, particularly preferably 1 to 10 carbon atoms, such as an acetylamino group or a benzoylamino group), an alkoxycarbonylamino group (an alkoxycarbonylamino group having preferably 2 to 30 carbon atoms, more preferably 2 to 20 carbon atoms, particularly preferably 2 to 12 carbon atoms, such as a methoxycarbonylamino group), an aryloxycarbonylamino group (an aryloxycarbonylamino group having preferably 7 to 30 carbon atoms, more preferably 7 to 20 carbon atoms, particularly preferably 7 to 12 carbon atoms, such as a phenyloxycarbonylamino group), a sulfonylamino group (a sulfonylamino group having preferably 1 to 30 carbon atoms, more preferably 1 to 20 carbon atoms, particularly preferably 1 to 12 carbon atoms, such as a methanesulfonylamino group or a benzenesulfonylamino group), a sulfamoyl group (a sulfamoyl group having preferably 0 to 30 carbon atoms, more preferably 0 to 20 carbon atoms, particularly preferably 0 to 12 carbon atoms, such as a sulfamoyl group, a methylsulfamoyl group, a dimethylsulfamoyl group or a phenylsulfamoyl group), a carbamoyl group (a carbamoyl group having preferably 1 to 30 carbon atoms, more preferably 1 to 20 carbon atoms, particularly preferably 1 to 12 carbon atoms, such as a carbamoyl group, a methylcarbamoyl group, a diethylcarbamoyl group or a phenylcarbamoyl group), an alkylthio group (an alkylthio group having preferably 1 to 30 carbon atoms, more preferably 1 to 20 carbon atoms, particularly preferably 1 to 12 carbon atoms, such as a methylthio group or an ethylthio group), an arylthio group (an arylthio group having preferably 6 to 30 carbon atoms, more preferably 6 to 20 carbon atoms, particularly preferably 6 to 12 carbon atoms, such as a phenylthio group), a heterocyclic thio group (a heterocyclic thio group having preferably 1 to 30 carbon atoms, more preferably 1 to 20 carbon atoms, particularly preferably 1 to 12 carbon atoms, such as a pyridylthio group, a 2-benzimidazolylthio group, a 2-benzoxazolylthio group or a 2-benzthiazolylthio group), a sulfonyl group (a sulfonyl group having preferably 1 to 30 carbon atoms, more preferably 1 to 20 carbon atoms, particularly preferably 1 to 12 carbon atoms, such as a mesyl group or a tosyl group), a sulfinyl group (a sulfinyl group having preferably 1 to 30 carbon atoms, more preferably 1 to 20 carbon atoms, particularly preferably 1 to 12 carbon atoms, such as a methanesulfinyl group or a benzenesulfinyl group), a ureido group (a ureido group having preferably 1 to 30 carbon atoms, more preferably 1 to 20 carbon atoms, particularly preferably 1 to 12 carbon atoms, such as a ureido group, a methylureido group or a phenylureido group), an amido phosphate group (an amido phosphate group having preferably 1 to 30 carbon atoms, more preferably 1 to 20 carbon atoms, particularly preferably 1 to 12 carbon atoms, such as a diethyl amido phosphate group or a phenyl amido phosphate group), a hydroxyl group, a mercapto group, a halogen atom (such as a fluorine atom, a chlorine atom, a bromine atom or an iodine atom, more preferably a fluorine atom), a cyano group, a sulfo group, a carboxyl group, an oxo group, a nitro group, a hydroxamic group, a sulfino group, a hydrazino group, an imino group, a heterocyclic group (a heterocyclic group having preferably 1 to 30 carbon atoms, more preferably 1 to 12 carbon atoms, and preferred examples of hetero atoms include a nitrogen atom, an oxygen atom, and a sulfur atom, such as an imidazolyl group, pyridyl group, a quinolyl group, a furyl group, a thienyl group, a piperidyl group, a morpholino group, a benzoxazolyl group, a benzimidazolyl group, a benzthiazolyl group, a carbazolyl group or an azepinyl group), a silyl group (a silyl group having preferably 3 to 40 carbon atoms, more preferably 3 to 30 carbon atoms, particularly preferably 3 to 24 carbon atoms, such as a trimethylsilyl group or a triphenylsilyl group), and a silyloxy group (a silyloxy group having preferably 3 to 40 carbon atoms, more preferably 3 to 30 carbon atoms, particularly preferably 3 to 24 carbon atoms, such as a trimethylsilyloxy group or a triphenylsilyloxy group). These substituents may be further substituted by one or more substituents selected from the aforementioned substituents Z.

Among the above, $R^1$ is preferably a hydrogen atom, an alkyl group or an aryl group, and more preferably a hydrogen atom or an alkyl group.

$R^2$ to $R^5$, except the one of $R^2$ to $R^5$ representing the single bond to W, each independently represent preferably a hydrogen atom, an alkyl group, an aryl group, an amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonyl amino group, a sulfonylamino group, a carbamoyl group, a sulfonyl group, a hydroxy group, a halogen atom, a cyano group, a carboxyl group, a nitro group or a heterocyclic group; more preferably a hydrogen atom, an alkyl group, an aryl group, an amino group, an alkoxy group, an aryloxy group, an acyl group, an acylamino group, a sulfonylamino group, a carbamoyl group, a sulfonyl group, a hydroxyl group, a halogen atom or a cyano group; and further preferably a hydrogen atom, an acyl group, a hydroxyl group, a halogen atom or a cyano group.

In Formulae (1) and (2), J represents *—CO—, *—COO—, *—CONR$^{10}$—, *—OCO—, a methylene group, a phenylene group or *—C$_6$H$_4$CO—. * represents the bonding position in the main chain. Among the above, J is preferably *—CO—, *—CONR$^{10}$—, a phenylene group or *—C$_6$H$_4$CO—, and more preferably *—C$_6$H$_4$CO—. R$^{10}$ represents a hydrogen atom, an alkyl group, an aryl group or an aralkyl group, and preferably a hydrogen atom, an alkyl group or an aryl group, and preferred definitions thereof are the same as those of the alkyl group and the aryl group described in the above section concerning substituent Z.

In Formulae (1) and (2), W represents a single bond or a divalent linking group.

Examples of the divalent linking group include an imino group, a straight-chain, branched or cyclic alkylene group (an alkylene group having preferably 1 to 30 carbon atoms, more preferably 1 to 12 carbon atoms, further preferably 1 to 4 carbon atoms, such as a methylene group, an ethylene group, a propylene group, a butylene group, a pentylene group, a hexylene group, an octylene group or a decylene group), an aralkylene group (an aralkylene group having preferably 7 to 30 carbon atoms, more preferably 7 to 13 carbon atoms, such as a benzylidene group or a cinnamylidene group), an arylene group (an arylene group having preferably 6 to 30 carbon atoms, more preferably 6 to 15 carbon atoms, such as a phenylene group, a cumenylene group, a mesitylene group, a tolylene group or a xylylene group), *—(CR$^{11}$R$^{12}$)$_n$NH-CONH— and *—(CR$^{11}$R$^{12}$)$_n$CONH—. * represents the bounding position in the main chain. R$^{11}$ and R$^{12}$ each independently represent a hydrogen atom or a substituent, and each independently represent preferably a hydrogen atom, an alkyl group, a halogen atom or a hydroxyl group, more preferably a hydrogen atom or an alkyl group, and further preferably a hydrogen atom. When there are two or more R$^{11}$s, they may be the same as each other, or some or all of R$^{11}$s may be different from each other. When there are two or more R$^{12}$s, they may be the same as each other, or some or all of R$^{12}$s may be different from each other. n represents a positive integer, preferably 1 to 10, and more preferably 2 to 5. Among these, the divalent linking group is preferably *—(CR$^{11}$R$^{12}$)$_n$NHCONH—, *—(CR$^{11}$R$^{12}$)$_n$CONH— or an imino group, and more preferably an imino group.

W preferably represents a single bond, an alkylene group or an arylene group, more preferably a single bond or an alkylene group, and further preferably a single bond.

W may further have a substituent, and examples of the substituent include those described in the above section concerning Z. Further, W may be formed by combining two or more of the divalent linking groups. It is also preferred that W includes an ether bond therein.

In Formula (1), A$^1$ represents a heterocyclic group. In the present invention, the term "heterocyclic group" refers to a monovalent group obtained by removing one hydrogen atom from a heterocyclic compound.

The heterocyclic group represented by A$^1$ is preferably a heterocyclic group capable of forming a colorant (in particular, a pigment). By having a heterocyclic group that exhibits high compatibility with the pigment via van der waals interaction, favorable adsorption properties with respect to the pigment may be achieved and a stable dispersion may be obtained.

The heterocyclic compound for forming the heterocyclic group is preferably a heterocyclic compound having at least one hydrogen bonding group in its molecule, and examples thereof include thiophene, furan, xanthene, pyrrole, imidazole, isoindoline, isoindolinone, benzimidazolone, indole, quinoline, carbazole, acridine, acridone, quinacridone, anthraquinone, phthalimide, chinaldine and quinophthalone.

Among these, benzimidazolone, indole, quinoline, carbazole, acridine, acridone, anthraquinone and phthalimide are particularly preferred.

The heterocyclic group is particularly preferably a heterocyclic group that is similar to the pigment to be used.

Specifically, in the invention, at least one selected from acridone, anthraquinone or the like is particularly preferably used when the pigment used is a quinacridone pigment. These compounds may strengthen the adsorption of the water-insoluble polymer and the colorant, and may reduce the amount of polymer liberated from the colorant, irrespective of the type or the amount of solvent used as the ink solvent.

In Formula (2), Q$^1$ represents a group of atoms that are necessary to form a ring together with carbon atoms (i.e., the two carbon atoms of —C=C—). The group of atoms is preferably such that the ring formed is composed of atoms each of which is selected from carbon, nitrogen, oxygen, silicon, phosphorus or sulfur, preferably composed of atoms each of which is selected from carbon, nitrogen, oxygen or sulfur, more preferably composed of atoms each of which is selected from carbon, nitrogen or oxygen, and further preferably composed of atoms each of which is selected from carbon or nitrogen. Q$^1$ including this group of atoms may be saturated or unsaturated, and when it is substitutable, Q$^1$ may have a substituent. Examples of the substituent include the groups described in the above section concerning Z.

In Formula (2), examples of the ring-structure group to be bound to W (a ring-structure group including Q$^1$ and the aryl group having R$^2$ to R$^5$) include a ring-structure group represented by any one of the following formulae (i) to (vi) that may have an unshown substituent (in the formulae, * represents the position of bonding to W). Among these, a ring-structure group represented by formula (i), (ii) or (iii) that may have an unshown substituent is preferred, and a ring-structure group represented by formula (i) that may have an unshown substituent is more preferred.

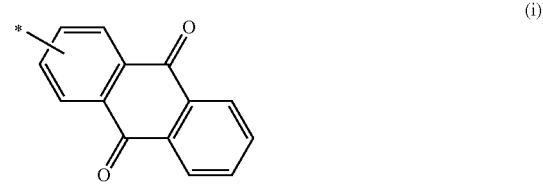

(i)

(ii)

(iii)

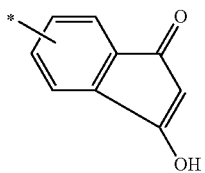
(iv)

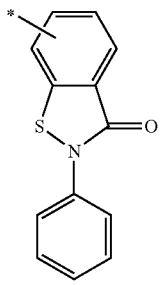
(v)

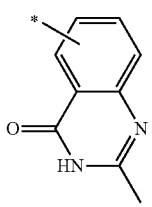
(vi)

The structural unit (repeating unit) represented by Formula (2) is preferably represented by the following Formula (3).

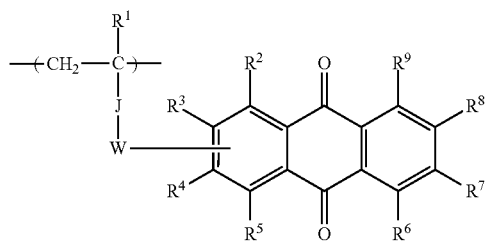
Formula (3)

In Formula (3), $R^6$ to $R^9$ each independently represent a hydrogen atom or a substituent. $R^1$ to $R^5$, J and W have the same definitions as $R^1$ to $R^5$, J and W in Formula (2), respectively, and preferred definitions of $R^1$ to $R^5$, J and W in Formula (3) are also the same as the preferred definitions of $R^1$ to $R^5$, J and W in Formula (2), respectively.

When any of $R^6$ to $R^9$ represents a substituent, examples of the substituent include the groups described in the section concerning Z. $R^6$ to $R^9$ each independently represent preferably a hydrogen atom, an alkyl group, an aryl group, an amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a carbamoyl group, a sulfonyl group, a hydroxyl group, a halogen atom, a cyano group, a carboxyl group, a nitro group or a heterocyclic group, more preferably a hydrogen atom, an alkyl group, an aryl group, an amino group, an alkoxy group, an aryloxy group, an acyl group, an acylamino group, a sulfonylamino group, a carbamoyl group, a sulfonyl group, a hydroxyl group, a halogen atom or a cyano group, further more preferably a hydrogen atom, an acyl group, a hydroxyl group, a halogen atom or a cyano group, and particularly preferably a hydrogen atom.

The combination of respective substituents in the repeating unit represented by Formula (3) is preferably the following combination of substituents (a), (b), (c) or (d), more preferably the combination of (b), (c) or (d), further preferably the combination of (c) or (d), and particularly preferably the combination (d). In the following, *— represents a bonding to the main chain.

(a) J represents *—CO—, *—CONR$^{10}$—, a phenylene group or *—C$_6$H$_4$CO—, $R^{10}$ represents a hydrogen atom, an alkyl group or an aryl group. W represents a single bond, an imino group, an alkylene group or an arylene group. $R^1$ represents a hydrogen atom, an alkyl group or an aryl group. $R^2$ to $R^5$ each independently represent a single bond, a hydrogen atom, an alkyl group, an aryl group, an amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a carbamoyl group, a sulfonyl group, a hydroxyl group, a halogen atom, a cyano group, carboxyl group, a nitro group or a heterocyclic group. One of $R^2$ to $R^5$ is a single bond to W. $R^6$ to $R^9$ each independently represent a hydrogen atom, an alkyl group, an aryl group, an amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a carbamoyl group, a sulfonyl group, a hydroxyl group, a halogen atom, a cyano group, a carboxyl group, a nitro group or a heterocyclic group.

(b) J represents *—C$_6$H$_4$CO—, *—CONR$^{10}$— or a phenylene group. $R^{10}$ represents a hydrogen atom or an alkyl group. W represents an imino group, a single bond or an arylene group. $R^1$ represents a hydrogen atom or an aryl group. $R^2$ to $R^5$ each independently represent a hydrogen atom, an alkyl group, an aryl group, an amino group, an alkoxy group, an aryloxy group, an acyl group, an acylamino group, a sulfonylamino group, a carbamoyl group, a sulfonyl group, a hydroxyl group, a halogen atom or a cyano group. One of $R^2$ to $R^5$ is a single bond to W. $R^6$ to $R^9$ each independently represent a hydrogen atom, an alkyl group, an aryl group, an amino group, an alkoxy group, an aryloxy group, an acyl group, an acylamino group, a sulfonylamino group, a carbamoyl group, a sulfonyl group, a hydroxyl group, a halogen atom or a cyano group.

(c) J represents *—C$_6$H$_4$CO— or *—CONR$^{10}$—. $R^{10}$ represents a hydrogen atom. W represents an imino group or a single bond. $R^1$ represents a hydrogen atom or an aryl group. $R^2$ to $R^5$ each independently represent a hydrogen atom, an acyl group, a hydroxyl group, a halogen atom or a cyano group. One of $R^2$ to $R^5$ is a single bond to W. $R^6$ to $R^9$ each independently represent a hydrogen atom, an acyl group, a hydroxyl group, a halogen atom or a cyano group.

(d) J represents *—C$_6$H$_4$CO—. W represents an imino group. $R^1$ represents a hydrogen atom or an aryl group. $R^2$ to $R^5$ each independently represent a hydrogen atom, an acyl group, a hydroxyl group, a halogen atom or a cyano group. One of $R^2$ to $R^5$ is a single bond to W. $R^6$ to $R^9$ each independently represent a hydrogen atom.

Specific examples of the repeating unit represented by Formula (1) include those shown below, but the invention is not limited to these examples.

M-1
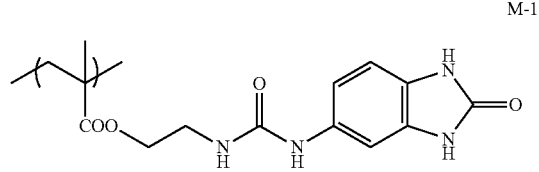
M-2
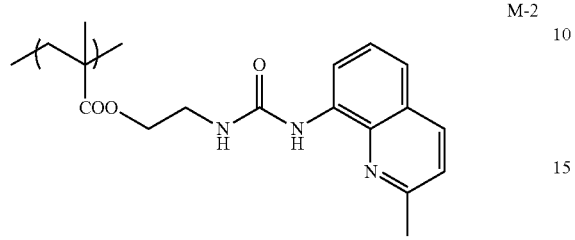
M-3
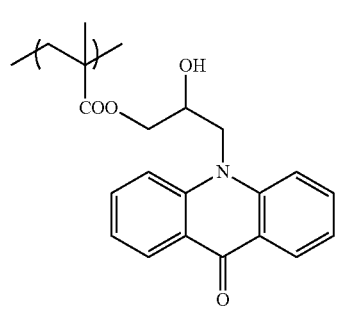
M-4
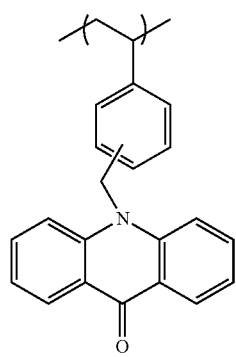
M-5
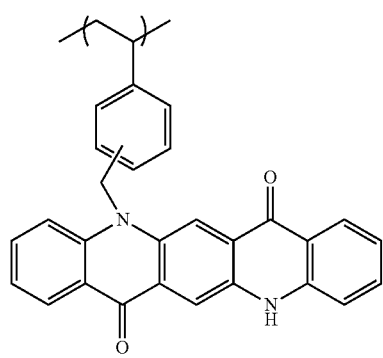
-continued
M-6
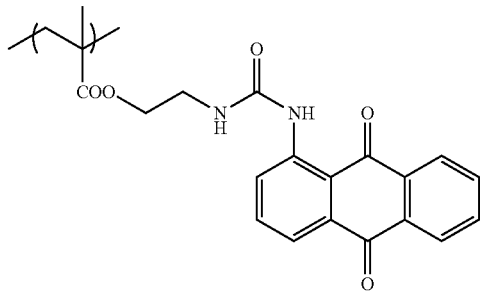
M-7
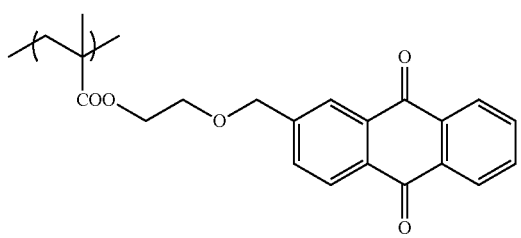
M-8
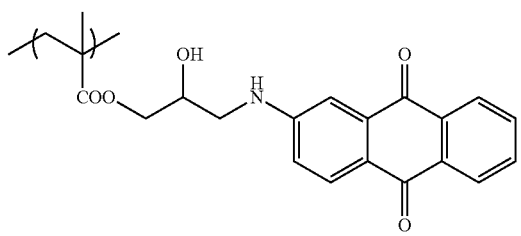
M-9
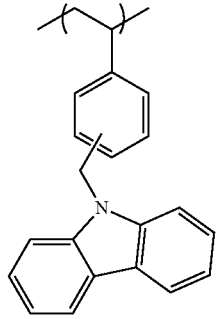
M-10
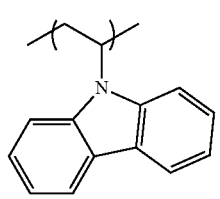
M-11
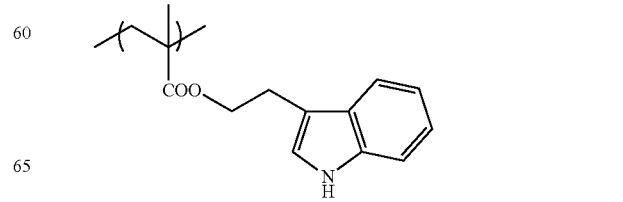

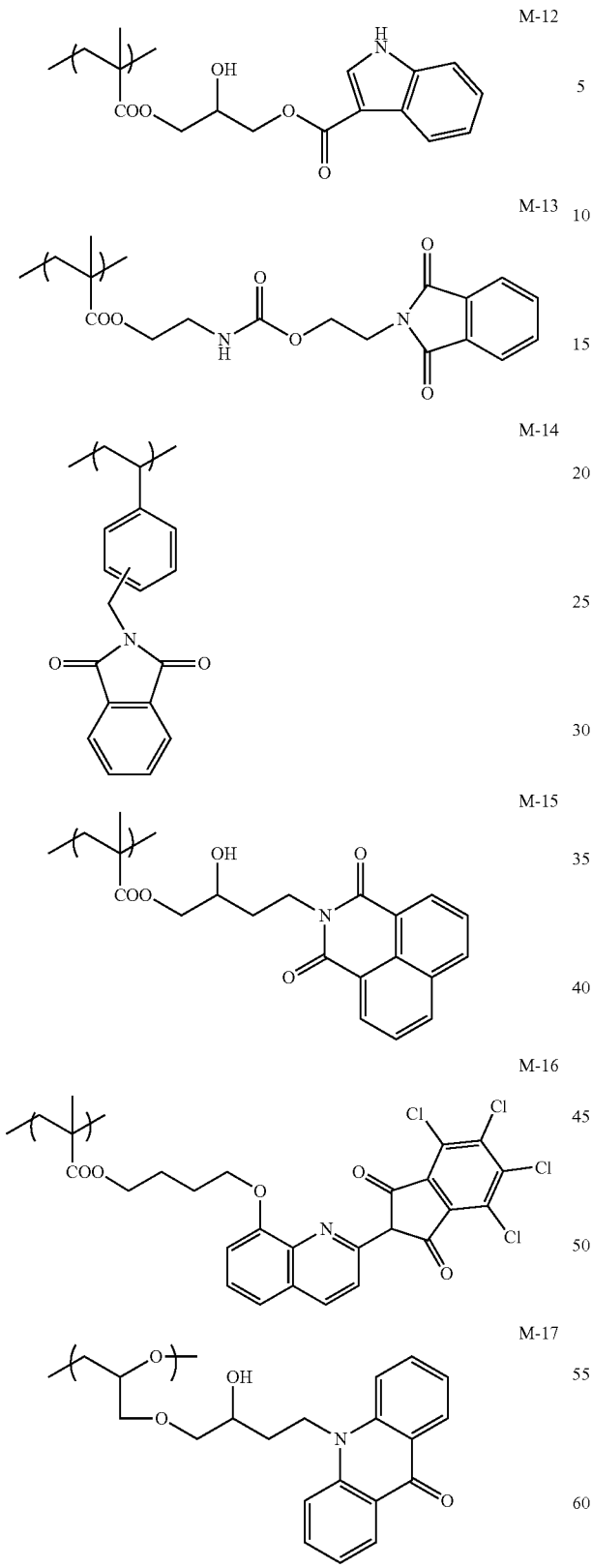
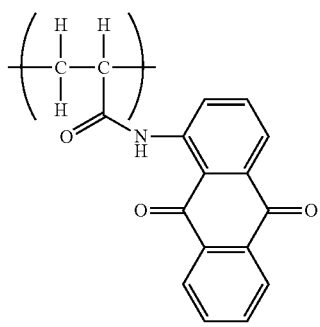
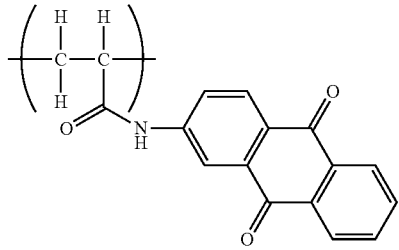
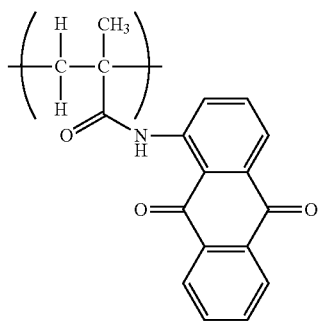
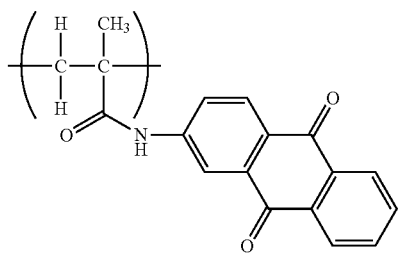
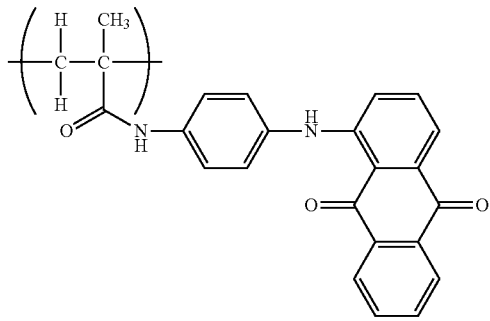
Specific examples of the repeating unit represented by Formula (2) include those shown below, but the invention is not limited to these examples.

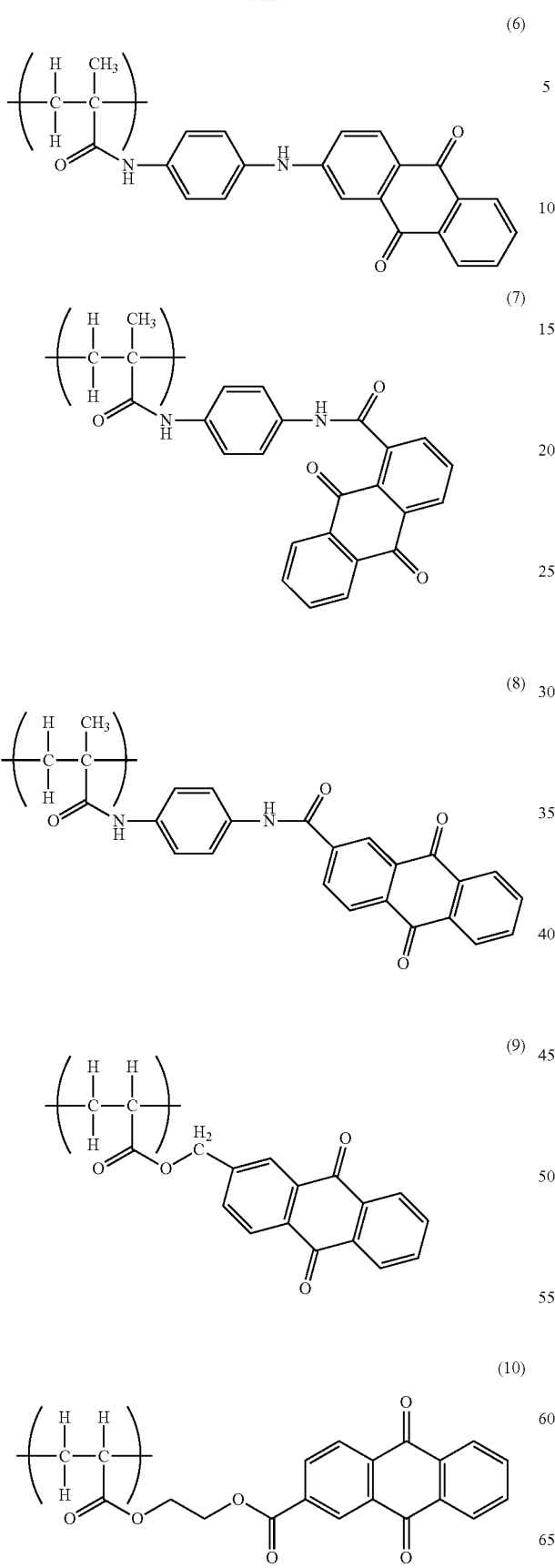
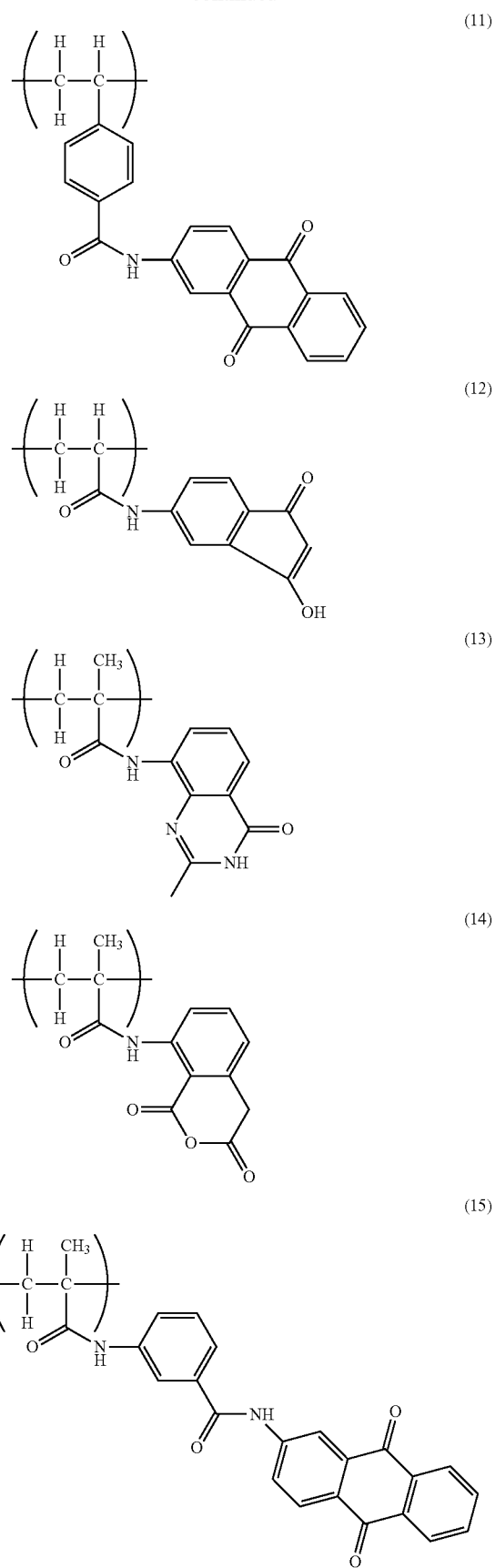

(16)

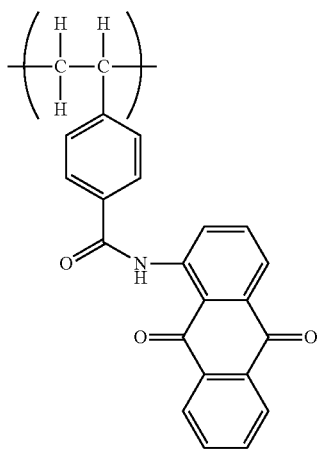

(17)

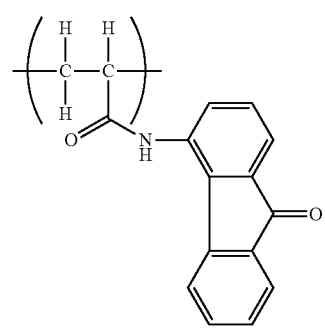

(18)

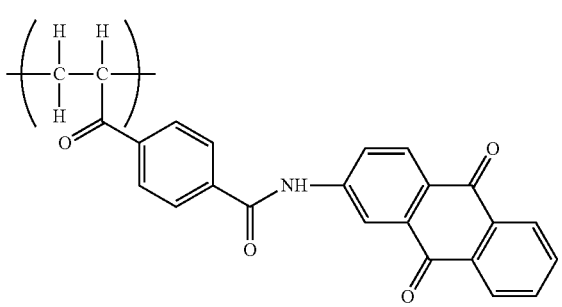

(19)

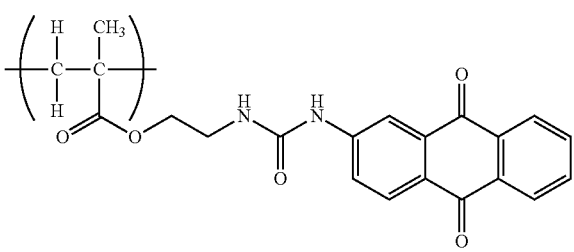

(20)

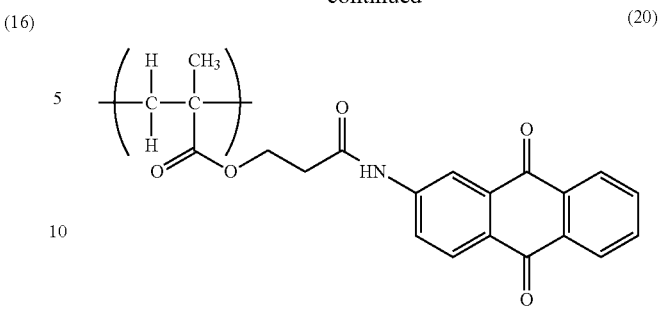

Component (c) is preferably a monomer including an aromatic ring or a monomer capable of forming a repeating unit that includes a heterocycle when used in the formation of the water-insoluble polymer, from the viewpoint of improving dispersibility of the colorant (in particular, a pigment) and reducing the amount of free polymer. In particular, component (c) is preferably a monomer component (hereinafter, referred to as c-1) capable of forming a repeating unit that includes a heterocycle when used in the formation of the water-insoluble polymer, from the viewpoint of improving dispersibility of the colorant (in particular, a pigment), reducing the amount of free polymer, and the like in the ink composition according to the invention.

The content of the component (c-1) in the component (c) is preferably from 10 to 100% by mass, and more preferably from 20 to 80% by mass, with respect to the total mass of component (c), from the viewpoint of reducing the amount of free polymer, and improving print density, abrasion resistance or the like.

The aromatic ring-containing monomer is preferably a styrenic monomer component (hereinafter, referred to as c-2), and further preferably a styrene or a 2-methyl styrene. The content of the component (c-2) in the component (c) is preferably from 10 to 100% by mass, and more preferably from 20 to 80% by mass, with respect to the total mass of component (c), from the viewpoint improving print density, abrasion resistance or the like.

Further, from the viewpoint of improving dispersibility of the colorant or the like, the component (c) is preferably an aromatic ring-containing monomer, and more preferably an aryl ester of (meth)acrylic acid (hereinafter, referred to as c-3). Component (c-3) is preferably a (meth)acrylate having an aryl alkyl group having 7 to 22 carbon atoms, more preferably 7 to 18 carbon atoms, further more preferably 7 to 12 carbon atoms, or a (meth)acrylate having an aryl group having 6 to 22 carbon atoms, more preferably 6 to 18 carbon atoms, further more preferably 6 to 12 carbon atoms. Specifically, preferred examples of these monomers include benzyl (meth)acrylate and phenoxyethyl (meth)acrylate. The content of the component (c-3) in the component (c) is preferably from 10 to 100% by mass, and more preferably from 20 to 80% by mass, with respect to the total mass of component (c), from the viewpoint of dispersibility of the colorant, or the like.

Each subclass of the component (c) (such as the component (c-1), (c-2), or (c-3)) may be used singly, or in combination of two or more kinds within the same subclass, and it is also preferred to combine the component (c-1) and the component (c-2); the component (c-2) and the component (c-3); or the component (c-1) and the component (c-3). From the viewpoint of reducing the amount of free polymer, it is more preferred to combine the component (c-1) and the component (c-2), or the component (c-2) and the component (c-3), and it is most preferred to combine the component (c-1) and the component (c-2).

In the invention, it is preferable that the monomer mixture that includes all of or at least one of components (a), (b) and (c) further includes a hydroxyl group-containing monomer (d) (hereinafter, also referred to as component (d)).

The component (d) has a function of enhancing dispersion stability. Examples of the component (d) include 2-hydroxyethyl (meth)acrylate, 3-hydroxypropyl (meth)acrylate, polyethyleneglycol (n=2-30, n represents an average addition mole number of oxyalkylene groups, the same applies hereinafter) (meth)acrylate, polypropyleneglycol (n=2-30) (meth)acrylate, and poly (ethyleneglycol (n=1-15).propyleneglycol (n=1-15)) (meth)acrylate. Among these, 2-hydroxyethyl (meth)acrylate, polyethyleneglycol monomethacrylate and polypropyleneglycol methacrylate are preferred.

The monomer mixture may further include a monomer (e) represented by the following Formula (4) (hereinafter, also referred to as component (e)).

$$CH_2=C(R^3)COO(R^4O)_pR^5 \quad \text{Formula (4)}$$

In Formula (4), $R^3$ represents a hydrogen atom or an alkyl group having 1 to 5 carbon atoms, $R^4$ represents a divalent hydrocarbon group having 1 to 30 carbon atoms that may have a hetero atom, $R^5$ represents a monovalent hydrocarbon group having 1 to 30 carbon atoms that may have a hetero atom, and p represents an average addition mole number of from 1 to 60, and preferably 1 to 30.

The component (e) exhibits excellent effects such as improving jetting stability of the ink composition, suppressing occurrence of ink-misdirection even during continuous printing, and the like.

In Formula (4), the hetero atom that $R^4$ may have and the hetero atom that $R^5$ may have are each independently, for example, a nitrogen atom, an oxygen atom, a halogen atom or a sulfur atom.

Representative examples of the group represented by $R^4$ include an aromatic group having 6 to 30 carbon atoms, a heterocyclic group having 3 to 30 carbon atoms and an alkylene group having 1 to 30 carbon atoms, and these groups may have a substituent. Representative examples of the group represented by $R^5$ include an aromatic group having 6 to 30 carbon atoms and a heterocyclic group having 3 to 30 carbon atoms, and these groups may have a substituent. $R^4$ and $R^5$ may be a combination of two or more kinds of groups. Examples of the substituent include an aromatic group, a heterocyclic group, an alkyl group, a halogen atom and an amino group.

Preferred examples of $R^4$ include a phenylene group that may have a substituent having 1 to 24 carbon atoms, an aliphatic alkylene group having 1 to 30 carbon atoms, preferably 1 to 20 carbon atoms, an alkylene group having 7 to 30 carbon atoms and having an aromatic ring, and an alkylene group having 4 to 30 carbon atoms and having a heterocycle. Particularly preferred specific examples of $R^4O$ group include an oxyethylene group, an oxy(iso)propylene group, an oxytetramethylene group, an oxyheptamethylene group, an oxyhexamethylene group, an oxyalkylene group having 2 to 7 carbon atoms formed from one or more kinds selected from these oxyalkylene groups, and an oxyphenylene group.

Preferred examples of $R^5$ include a phenyl group, an aliphatic alkyl group having 1 to 30 carbon atoms, preferably an aliphatic alkyl group having 1 to 20 carbon atoms that may have a branched chain, an alkyl group having 7 to 30 carbon atoms having an aromatic ring, and an alkyl group having 4 to 30 carbon atoms having a heterocycle. More preferred examples of $R^5$ include an alkyl group having 1 to 12 carbon atoms such as a methyl group, an ethyl group, an (iso)propyl group, an (iso)butyl group, an (iso)pentyl group or an (iso)hexyl group, and a phenyl group.

Specific examples of the component (e) include methoxypolyethyleneglycol (p in Formula (4) is from 1 to 30) (meth)acrylate, methoxypolytetramethyleneglycol (p=1 to 30) (meth)acrylate, ethoxypolyethyleneglycol (p=1 to 30) (meth)acrylate, (iso)propoxypolyethyleneglycol (p=1 to 30) (meth)acrylate, butoxypolyethyleneglycol (p=1 to 30) (meth)acrylate, octoxypolyethyleneglycol (p=1 to 30) (meth)acrylate, methoxypolypropyleneglycol (p=1 to 30) (meth)acrylate, and methoxy(ethyleneglycol.propyleneglycol copolymer) (p=1 to 30, among which the ethylene glycol portion is 1 to 29) (meth)acrylate. Among these, methoxypolyethyleneglycol (p=1 to 30) (meth)acrylate is preferred.

Specific commercially-available examples of the components (d) and (e) include polyfunctional acrylate monomers (NK ESTER) M-40G, 90G and 230G (trade name, available from Shin-Nakamura Chemical Co., Ltd.); and BLEMMER series, PE-90, 200 and 350, PME-100, 200, 400 and 1000, PP-1000, PP-500, PP-800, AP-150, AP-400, AP-550, AP-800, 50PEP-300, 50POEP-800B and 43PAPE-600B (trade names, available from NOF Corporation).

The component (a) may be used singly, or in combination of two or more kinds thereof. The component (b) may be used singly, or in combination of two or more kinds thereof. The component (c) may be used singly, or in combination of two or more kinds thereof. The component (d) may be used singly, or in combination of two or more kinds thereof. The component (e) may be used singly, or in combination of two or more kinds thereof.

The contents of the components (a) to (e) in the monomer mixture are as follows.

The content of the component (a) is preferably from 1 to 50% by mass, more preferably from 2 to 40% by mass, and particularly preferably from 3 to 20% by mass, from the viewpoint of dispersion stability of the obtained water-insoluble polymer particles including a colorant (in particular, a pigment), or the like.

The content of the component (b) is preferably from 0 to 50% by mass, more preferably from 1 to 50% by mass, and still more preferably from 5 to 49% by mass, from the viewpoint of dispersion stability of the water-insoluble polymer particles including a colorant (in particular, a pigment), or the like.

The content of the component (c) is preferably from 0 to 98% by mass, more preferably from 5 to 98% by mass, and still more preferably from 10 to 60% by mass, from the viewpoint of dispersion stability of the water-insoluble polymer particles including a colorant (in particular, a pigment), or the like.

The mass ratio of the content of the component (a) to the total content of the component (b) and the component (c) ((a)/[(b)+(c)]) is preferably from 0.01 to 1, more preferably from 0.02 to 0.67, and further preferably from 0.03 to 0.50, from the viewpoint of jettability of the obtained ink composition, or the like.

The content of the component (d) is preferably from 0 to 40% by mass, more preferably from 5 to 40% by mass, and still more preferably from 7 to 30% by mass, from the viewpoint of jettability and dispersion stability, or the like.

The content of the component (e) is preferably from 0 to 50% by mass, more preferably from 5 to 50% by mass, and still more preferably from 10 to 40% by mass, from the viewpoint of jettability and dispersion stability, or the like.

The total content of the component (a) and the component (d) is preferably from 6 to 60% by mass, and more preferably from 10 to 50% by mass, from the viewpoint of dispersion stability in water, or the like.

The total content of the component (a) and the component (e) is preferably from 6 to 75% by mass, and more preferably from 13 to 50% by mass, from the viewpoint of dispersion stability in water, jettability, or the like.

The total content of the component (a), the component (d) and the component (e) is preferably from 6 to 60% by mass, more preferably from 7 to 50% by mass, from the viewpoint of dispersion stability in water and jettability.

Production of Water-Insoluble Polymer

The water-insoluble polymer that forms the water-insoluble polymer particles according to the invention may be produced by copolymerizing the aforementioned monomer mixture by a known polymerization method, such as a mass polymerization method, a solution polymerization method, a suspension polymerization method or an emulsion polymerization method. Among these polymerization methods, when the polymerization is performed by a solution polymerization method, effects of the invention, especially pigment dispersibility or the like, may be suitably obtained.

The solvent used in the solution polymerization method is preferably a polar organic solvent having high compatibility with a water-insoluble polymer. Examples of the polar organic solvents include aliphatic alcohols such as butoxy ethanol; aromatic compounds such as toluene or xylene; ketones such as methyl ethyl ketone and methyl isobutyl ketone; esters such as ethyl acetate; dimethyl sulfoxide, dimethyl formamide, and N-methyl-2-pyrrolidone. Among these, methyl ethyl ketone, methyl isobutyl ketone, toluene, xylene, butoxy ethanol or a mixed solvent of water and one or more kinds of these solvents is preferably used.

A known radical polymerization initiator may be used when polymerization is performed, and examples thereof include an azo compound such as 2,2'-azobis(isobutyronitrile) or 2,2'-azobis(2,4-dimethylvaleronitrile) and an organic peroxide such as tert-butylperoxyoctoate or dibenzoyloxide. The amount of radical polymerization initiator is preferably from 0.01 to 5 mol, more preferably from 0.01 to 2 mol, with respect to 1 mol of the monomer mixture. Further, a known polymerization chain transfer agent may be added during polymerization, and examples thereof include mercaptans such as octylmercaptan or 2-mercaptoethanol, and thiuram disulfides.

The conditions for polymerization of the monomer mixture may differ depending on the type of radical polymerization initiator, monomer, solvent or the like to be used. However, typically, the polymerization temperature is preferably from 30 to 100° C., and more preferably from 50 to 80° C., while the polymerization time is preferably from 1 to 20 hours. The atmosphere for polymerization is preferably a nitrogen gas atmosphere or an inert gas, such as argon, atmosphere.

After the completion of polymerization reaction, the produced polymer may be isolated from the reaction solution by a known method such as reprecipitation, solvent distillation, or the like. Further, the obtained polymer may be purified by removing unreacted monomers or the like by repeating reprecipitation, or by performing membrane separation, chromatography, extraction or the like.

The weight average molecular weight of the obtained polymer is preferably from 5,000 to 500,000, more preferably from 10,000 to 400,000, and particularly preferably from 10,000 to 300,000, from the viewpoint of dispersion stability of the pigment, water resistance, jettability or the like. The weight average molecular weight of the polymer may be measured by a method described in the Examples section.

The solid content of the water-insoluble polymer solution is preferably from 3 to 30% by mass, more preferably from 5 to 20% by mass, particularly preferably from 10 to 15% by mass.

When the water-insoluble polymer has a salt-forming group derived from the monomer having a salt-forming group (a), the polymer is neutralized with a neutralizer when used. An acid or a base may be used as the neutralizer depending on the kind of a salt-forming group in the water-insoluble polymer. Examples of the neutralizers include acids such as hydrochloric acid, acetic acid, propionic acid, phosphoric acid, sulfuric acid, lactic acid, succinic acid, glycolic acid, gluconic acid or glyceric acid, and bases such as lithium hydroxide, sodium hydroxide, potassium hydroxide, ammonia, methylamine, dimethylamine, trimethylamine, ethylamine, diethylamine, triethylamine, triethanolamine, tributylamine, tetramethylammonium hydroxide, benzyltrimethylammonium hydroxide, choline hydroxide or tetrabutylammonium hydroxide.

The degree of neutralization of the water-insoluble polymer is preferably from 10 to 200%, more preferably from 20 to 150%, and particularly preferably from 50 to 150%.

When the salt-forming group is an anionic group, the degree of neutralization may be calculated by the following formula.

$$\{[\text{mass of neutralizer}(g)/\text{equivalent weight of neutralizer}]/[\text{acid value of polymer (KOHmg/g)} \times \text{mass of polymer}(g)/(56 \times 1000)]\} \times 100$$

When the salt-forming group is a cationic group, the degree of neutralization may be calculated by the following formula.

$$\{[\text{mass of neutralizer}(g)/\text{equivalent weight of neutralizer}]/[\text{amine value of polymer(HCLmg/g)} \times \text{mass of polymer}(g)/(36.5 \times 1000)]\} \times 100$$

The acid value or the amine value may be obtained by calculating from the structural unit of the water-insoluble vinyl polymer, or may be obtained by dissolving the polymer in a suitable solvent (such as methyl ethyl ketone) and performing titration.

Crosslinking Agent

The water-insoluble polymer particles of the invention is preferably polymer particles obtained by mixing a crosslinking agent and a water-insoluble polymer including a structural unit derived from a monomer having a salt-forming group (a) and at least of a structural unit derived from a styrenic macromer (b) or a structural unit derived from a hydrophobic monomer (c); and crosslinking the water-insoluble polymer.

The crosslinking agent is preferably a compound having at least two reactive groups in a molecule thereof for appropriately crosslinking the water-insoluble polymer. The molecular weight of the crosslinking agent is preferably from 120 to 2,000, more preferably from 150 to 1,500, and particularly preferably from 150 to 1,000, from the viewpoints of high reactivity and storage stability of the obtained crosslinked polymer particles.

The number of the reactive groups included in the crosslinking agent is preferably from 2 to 4, and most preferably 2, from the viewpoints of improving the colorant dispersibility and jetting stability by controlling the molecular weight of the crosslinking agent and from the viewpoints of suppressing foaming of the ink and improving defoaming property. The reactive groups may each be at least one selected from the group consisting of a hydroxyl group, an epoxy group, an aldehyde group, an amino group, and a carboxyl group.

Specific examples of the crosslinking agent include:

(a) a compound having at least two hydroxyl groups in a molecule thereof, such as a polyhydric alcohol such as ethylene glycol, diethylene glycol, triethylene glycol, polyethylene glycol, glycerin, polyglycerin, propylene glycol, 1,4-butanediol, 1,5-pentanediol, 1,6-hexanediol, neopentyl alcohol, diethanolamine, tridiethanolamine, polypropylene glycol, polyvinyl alcohol, pentaerythritol, sorbitol, sorbitan, glucose, mannitol, mannitan, sucrose or glucose;

(b) a compound having at least two epoxy groups in a molecule thereof (for example, polyglycidyl ethers such as ethylene glycol diglycidyl ether, polyethylene glycol diglycidyl ether, glycerin triglycidyl ether, or polyglycerol polyglycidyl ether);

(c) a compound having at least two aldehyde groups in a molecule thereof (for example, polyaldehydes such as glutaraldehyde or glyoxal);

(d) a compound having at least two amino groups in a molecule thereof (for example, polyamines such as ethylenediamine or polyethyleneimine); and (e) a compound having at least two carboxyl group in a molecule thereof (for example, polyvalent carboxylic acids such as oxalic acid, malonic acid, succinic acid, fumaric acid, maleic acid, or adipic acid.

The water-insoluble polymer has a salt-forming group (crosslinkable functional group) that can react with the crosslinking agent. Examples of preferable combinations of the water-insoluble polymer and crosslinking agent are described in the following.

When the salt-forming group of a water-insoluble polymer is an acidic group such as a carboxyl group, sulfonic acid group, or phosphoric acid group, the crosslinking agent is preferably selected from the compounds (a), (b) and (d) described above.

When the salt-forming group of a water-insoluble polymer is an amino group, the crosslinking agent is preferably selected from the compounds (b), (c) and (e) described above.

In particular, from the viewpoint of controlling crosslinking so as to impart an appropriate crosslinking structure to the water-insoluble polymer, it is preferable to use a combination of (b) a compound having at least two epoxy groups in a molecule thereof and a water-insoluble polymer having at least one salt-forming group selected from the group consisting of an acidic group (such as a carboxyl group, a sulfonic acid group, or a phosphoric acid group) and an amino group.

The water-insoluble polymer having, as a salt-forming group (crosslinkable functional group) that can react with the crosslinking agent, an acidic group (such as a carboxyl group, a sulfonic acid group, or a phosphoric acid group) or an amino group may be produced by copolymerizing a polymerizable monomer composition including a monomer having the salt-forming group in the above-described production of the water-insoluble polymer.

An example of the polymer having a salt-forming group such as an acidic group or an amino group, as a salt-forming group that can react with the crosslinking agent, includes a polymer obtained by copolymerizing the monomer having a salt-forming group.

The water-insoluble polymer particles contained in the ink composition of the invention is preferably crosslinked water-insoluble polymer particles.

Regarding a method of crosslinking the water-insoluble polymer particles to produce crosslinked water-insoluble polymer particles, for example, (i) crosslinked water-insoluble polymer particles may be obtained by allowing water-insoluble polymer particles containing a colorant to react with a crosslinking agent, or (ii) water-insoluble polymer particles that does not contain a colorant may be crosslinked to obtain crosslinked water-insoluble polymer particles, followed by allowing the crosslinked water-insoluble polymer particles to contain a colorant. Of these, the method (i) is preferable from the viewpoints of storage stability and the ease in production.

Compound Represented by Formula (A)

The ink composition of the invention includes: the water-insoluble polymer particles containing a colorant; and at least one compound (which may also be referred to as "specific compound") represented by formula (A) described below.

In the invention, it is preferable that the water-insoluble polymer particles be crosslinked because the water-insoluble polymer particles can contain a larger amount of the compound when the water-insoluble polymer has an appropriate crosslinking structure; when the compound is contained in the crosslinked water-insoluble polymer particles, it is thought that foaming of the ink composition is suppressed, and excellent defoaming property is imparted to the ink composition.

The specific compound has a molecular weight of preferably from 100 to 2,000, and more preferably from 100 to 1,200, from the viewpoints of suppressing adhesion of the ink composition to a nozzle member and improving jetting property and defoaming property.

The amount of the specific compound which can be dissolved in 100 g of water (at 20° C.) is preferably 5 g or less, more preferably 3 g or less, furthermore preferably 1 g or less, and particularly preferably 0.5 g or less.

The specific compound has a Log P value of preferably from 4 to 16, more preferably from 5 to 16, and particularly preferably from 6 to 15, from the viewpoints of suppressing adhesion of the ink composition containing the water-insoluble polymer to a nozzle member, and improving jetting property and defoaming property.

As used herein, the "Log value" refers to a logarithmic value of 1-octanol/water partition coefficient of a particular compound, and a value calculated by fragment approach using SRC's LOGKOW/KOWWIN program of KowWin is used (Syracuse Research Corporation, USA) (The KowWin Program methodology is described in the following journal article: Maylan, W. M. and P. H. Howard, 1995. Atom/fragment contribution method for estimating octanol-water partition coefficients. J. Pharm. Sci. 84: 83-92). Fragment approach is based on the chemical structure of a compound, especially, the number of atoms and the type of chemical bonding. The Log P value is a numerical value generally used for relative evaluation of hydrophilicity/hydrophobicity of organic compounds.

The specific compound is a compound represented by the following formula (A).

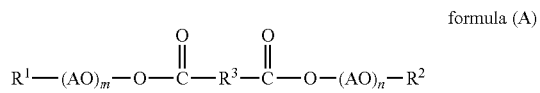

formula (A)

In formula (A), $R^1$ and $R^2$ each independently represent a hydrogen atom or a hydrocarbon group having 1 to 22 carbon atoms; $R^3$ represents a divalent hydrocarbon group having 1 to 18 carbon atoms; $R^1$ and $R^2$ may be the same as or different from each other, but $R^1$ and $R^2$ do not both represent a hydrogen atom at the same time; $R^1$ to $R^3$ may each have a substituent; m and n each independently represent an average addition mole number of AO of from 0 to 30; and AO represents an alkylene oxy group.

$R^1$ and $R^2$ each independently represent a linear or branched alkyl group having preferably 2 to 18 carbon atoms, and more preferably 4 to 12 carbon atoms; a linear or branched alkenyl group having preferably 2 to 18 carbon atoms, and more preferably 4 to 12 carbon atoms; an aralkyl group having 7 to 23 carbon atoms, and preferably 7 to 11 carbon atoms; or an aryl group having 6 to 22 carbon atoms, and preferably 6 to 10 carbon atoms, from the viewpoints of suppressing ink adhesion to a nozzle member and improving jetting property and defoaming property.

Preferable examples include a methyl group, an ethyl group, a propyl group, an isopropyl group, a butyl group, a hexyl group, a 2-ethylhexyl group, an octyl group, a dodecyl group, a cetyl group, a phenyl group, and benzyl group. The same applies to the formulae described hereinbelow.

$R^3$ preferably represents a divalent aliphatic hydrocarbon group, an alicyclic hydrocarbon group, or an aromatic hydrocarbon group. More preferably, $R^3$ represents an alkylene group having preferably 2 to 15 carbon atoms, more preferably 2 to 12 carbon atoms, and particularly preferably 2 to 8 carbon atoms; an alkenylene group having preferably 2 to 15 carbon atoms, more preferably 2 to 12 carbon atoms, and particularly preferably 2 to 8 carbon atoms; an arylene group having 6 to 10 carbon atoms (more preferably, a phenylene group); or a cyclic saturated or unsaturated hydrocarbon group having 3 to 8 carbon atoms. Specific examples thereof include an ethylene group, a trimethylene group, a propane-1,2-diyl group, a tetramethylene group, a heptamethylene group, a hexamethylene group, a pentane-1,5-diyl group, an octamethylene group, a dodecamethylene group, and a phenylene group. The same applies to the formulae described hereinbelow.

In formula (A), m and n each independently represent a number of preferably 0 to 20, more preferably 0 to 15, furthermore preferably 1 to 15, particularly preferably 2 to 14, and most preferably 2 to 12.

AO represents an alkylene oxy group having 2 to 4 carbon atoms, such as an ethylene oxy group (EO), a propylene oxy group (such as a trimethylene oxy group or a propane-1,2-diyl oxy group) (PO), or a butylene oxy group (such as a tetramethylene oxy group).

When m is 2 or greater, there are plural AOs in (AO)m, and the plural AOs may be the same as each other or some or all of them may be different from each other. When the plural AOs include different kinds of AO, each kind of AO may be incorporated by block addition or random addition.

When n is 2 or greater, there are plural AOs in (AO)n, and the plural AOs may be the same as each other or some or all of them may be different from each other. When the plural AOs include different kinds of AO, each kind of AO may be incorporated by block addition or random addition.

The kinds of the AOs in (AO)m and the kinds of the AOs in (AO)n may be the same or partially overlap or different.

Examples of the substituent which may be held by any of $R^1$ to $R^3$ include a halogen atom such as a fluorine atom, a chlorine atom, or a bromine atom; an alkoxy group having 1 to 12 carbon atoms, such as a methoxy group, an ethoxy group, or an isopropoxy group; an aryloxy group such as a phenyloxy group; an oxycarbonyl group such as a methoxycarbonyl group; an acyl group such as an acetyl group or a benzoyl group; an acyloxy group such as an acetyloxy group; a cyano group; a nitro group; a hydroxyl group; a carboxyl group; an oxo group; an epoxy group; an ether group; and an ester group (these atoms and groups are collectively called "substituent(s)"). Only one substituent may be used, or two or more substituents may be used.

The substituent which may be held by $R^3$ is preferably —CO(O)-(AO)$_L$—$R^4$, in which AO has the same definition as described above; L has the same definition as that of m described above, and preferable ranges thereof are also the same; $R^4$ has the same definition as that of $R^1$ described above, and preferable ranges thereof are also the same. In this case, $R^3$ is preferably an aromatic hydrocarbon group.

The compound represented by formula (A) is preferably one selected from the group consisting of (1) aliphatic carboxylic acid ester, (2) aromatic carboxylic acid ester, and (3) cycloalkane or cycloalkene carboxylic acid ester.

More specifically, the (1) aliphatic carboxylic acid ester is preferably a compound represented by formula (A) in which $R^3$ represents a divalent aliphatic hydrocarbon group which may have a substituent. Examples of this substituent are the same as those described above.

Specific examples of the aliphatic carboxylic acid ester include aliphatic dibasic acid esters such as dimethyl adipate, diethyl adipate, dibutyl adipate, diisobutyl adipate, bis(2-ethylhexyl)adipate, diisononyl adipate, diisodecyl adipate, bis(butyldiethyleneglycol)adipate, dimethyl sebacate, diethyl sebacate, dibutyl sebacate, bis(2-ethylhexyl)sebacate, diethyl succinate, or bis(2-ethylhexyl)azelate. Of these, particularly preferable are aliphatic dibasic acid diesters having 6 to 14 carbon atoms, such as diethyl adipate, dibutyl adipate, diisobutyl adipate, bis(butyldiethyleneglycol)adipate, bis(octoxypolyethylene glycol)adipate ($R^1$ and $R^2$ each represent 2-ethylhexyl, and m and n (each representing an average addition mole number of EO) are from 1 to 4), bis(octoxypolypropylene glycol)adipate ($R^1$ and $R^2$ each represent 2-ethylhexyl, and m and n (each representing an average addition mole number of PO) are from 1 to 6), bis(octoxypolyethylene glycol-polypropylene glycol)adipate ($R^1$ and $R^2$ each represent 2-ethylhexyl, and m and n (each representing a total average addition mole number of EO and PO) are from 4 to 12, block addition), bis(octoxypoly(ethylene glycol-propylene glycol))adipate ($R^1$ and $R^2$ each represent 2-ethylhexyl, and m and n (each representing a total average addition mole number of EO and PO) are from 4 to 12, random addition), diethyl sebacate, dibutyl sebacate, or diisobutyl sebacate.

More specifically, the (2) aromatic carboxylic acid ester is preferably a compound represented by the following formula (B).

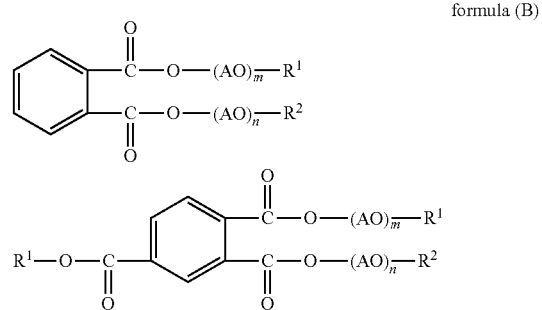

formula (B)

In formula (B), $R^1$ and $R^2$ have the same definition as that described above, and may be the same as or different from each other; AO, m and n respectively have the same definitions as those described above. When m is 2 or greater, there are plural AOs in (AO)m, and the plural AOs may be the same as each other or some or all of them may be different from each other. When the plural AOs include different kinds of AO, each kind of AO may be incorporated by block addition or random addition.

When n is 2 or greater, there are plural AOs in (AO)n, and the plural AOs may be the same as each other or some or all of them may be different from each other. When the plural AOs include different kinds of AO, each kind of AO may be incorporated by block addition or random addition.

The kinds of the AOs in (AO)m and the kinds of the AOs in (AO)n may be the same or partially overlap or different.

Specific examples of the aromatic carboxylic acid ester include: phthalic acid esters such as dimethyl phthalate, diethyl phthalate, dibutyl phthalate, diisobutyl phthalate, bis (2-ethylhexyl)phthalate, di-n-octylphthalate, diisodecyl phthalate, butylbenzyl phthalate, octylbenzyl phthalate, nonylbenzyl phthalate, stearylbenzyl phthalate, octyldecyl phthalate, dicyclohexyl phthalate, diphenyl phthalate, bis (dimethylcyclohexyl)phthalate, bis(t-butylcyclohexyl)phthalate, or ethylphthalyl ethyl glycolate; and trimellitic acid esters such as tributyl trimellitate, triisobutyl trimellitate, or tri(2-ethylhexyl)trimellitate. Of these, particularly preferable are phthalic acid diesters having an aliphatic alcohol residue having 1 to 5 carbon atoms, such as dimethyl phthalate, diethyl phthalate, dibutyl phthalate, or diisobutyl phthalate; benzyl phthalate having an alkyl group having 3 to 18 carbon atoms, such as octylbenzyl phthalate, nonylbenzyl phthalate, or stearylbenzyl phthalate; phthalic acid esters such as bis (octoxypolyethylene glycol) phthalate ($R^1$ and $R^2$ each represent 2-ethylhexyl, and m and n (each representing an average addition mole number of EO) are from 1 to 5), bis (octoxypolypropylene glycol) phthalate ($R^1$ and $R^2$ each represent 2-ethylhexyl, and m and n (each representing an average addition mole number of PO) are from 1 to 4), bis (octoxypolyethylene glycol-polypropylene glycol) phthalate ($R^1$ and $R^2$ each represent 2-ethylhexyl, and m and n (each representing a total average addition mole number of EO and PO) are from 4 to 12, block addition), or bis[octoxypoly (ethylene glycol-propylene glycol)]phthalate ($R^1$ and $R^2$ each represent 2-ethylhexyl, and m and n (each representing a total average addition mole number of EO and PO) are from 4 to 12, random addition); and trimellitic acid diesters having an aliphatic alcohol residue having 3 to 5 carbon atoms, such as tributyl trimellitate or triisobutyl trimellitate.

More specifically, the (3) cycloalkane or cycloalkene carboxylic acid ester is preferably a cyclohexane or cyclohexene carboxylic acid ester represented by the following formula (C). An example of the cycloalkane or cycloalkene group include a cyclic hydrocarbon group which may have an unsaturated group having 3 to 8 carbon atoms.

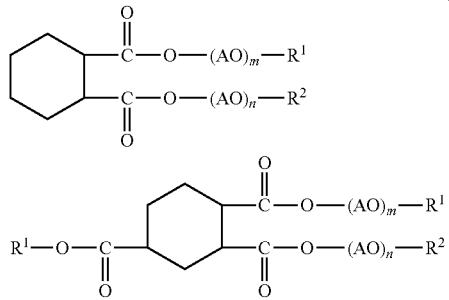

formula (C)

In formula (C), $R^1$ and $R^2$ have the same definition as that described above, and may be the same as or different from each other; AO, m and n respectively have the same definitions as those described above. When m is 2 or greater, there are plural AOs in (AO)m, and the plural AOs may be the same as each other or some or all of them may be different from each other. When the plural AOs include different kinds of AO, each kind of AO may be incorporated by block addition or random addition.

When n is 2 or greater, there are plural AOs in (AO)n, and the plural AOs may be the same as each other or some or all of them may be different from each other. When the plural AOs include different kinds of AO, each kind of AO may be incorporated by block addition or random addition.

The kinds of the AOs in (AO)m and the kinds of the AOs in (AO)n may be the same or partially overlap or different.

Specific examples of cycloalkane or cycloalkene carboxylic acid ester include: cyclohexane carboxylic acid esters such as dibutyl 1,2-cyclohexane dicarboxylic acid ester or diisononyl 1,2-cyclohexane dicarboxylic acid ester; and cyclohexene carboxylic acid esters such as dibutyl 3,4-cyclohexene dicarboxylic acid ester or diisononyl 3,4-cyclohexene carboxylic acid ester.

Among the specific compounds (1) to (3), one specific compound may be used singly, or two or more of them may be used. Of these, the specific compound is preferably a compound represented by formula (A) from the viewpoints of suppressing bubbling of ink, suppressing ink adhesion to a member such as a nozzle plate or the like used for an inkjet recording apparatus, and improving ink removability.

The specific compound may be added to the ink composition during or after at least one of step (1) or step (2) of the method of producing an ink composition described below.

From the viewpoints of suppressing bubbling in the production process or suppressing adhesion of the colorant to a production apparatus, the specific compound is preferably mixed with a colorant aqueous dispersion of the water-insoluble polymer particles containing a colorant, which is obtained in the step (2), or the specific compound is preferably mixed with an aqueous dispersion of the crosslinked water-insoluble polymer particles further containing a colorant.

Regarding the mixing ratio between the specific compound and the colorant aqueous dispersion of the water-insoluble polymer particles containing a colorant, which is obtained in the step (2), the amount of the specific compound is preferably from 1 to 100 parts by weight, more preferably from 3 to 50 parts by weight, and furthermore preferably from 3 to 30 parts by weight, with respect to 100 parts by weight of the solid contents (i.e., colorant and water-insoluble polymer) of the aqueous dispersion of the water-insoluble polymer particles, from the viewpoints of storage stability and jetting stability after long-term storage.

Regarding the mixing ratio between the specific compound and the colorant aqueous dispersion of the crosslinked water-insoluble polymer particles, the amount of the specific compound is preferably from 1 to 100 parts by weight, more preferably from 3 to 50 parts by weight, and furthermore preferably from 3 to 30 parts by weight, with respect to 100 parts by weight of the solid contents (i.e., colorant and crosslinked water-insoluble polymer) of the colorant aqueous dispersion of the crosslinked water-insoluble polymer particles from the viewpoints of storage stability and jetting stability after long-term storage.

Moreover, the amount of the specific compound is preferably from 5 to 300 parts by weight, more preferably from 15 to 150 parts by weight, furthermore preferably from 20 to 200 parts by weight, and particularly preferably from 30 to 95 parts by weight, with respect to 100 parts by weight of the crosslinked water-insoluble polymer, from the viewpoints of storage stability and jetting stability after long-term storage.

Regarding the method of mixing the specific compound and the colorant aqueous dispersion of the water-insoluble polymer particles containing a colorant and the method of mixing the specific compound and the aqueous dispersion of the crosslinked water-insoluble polymer particles containing a colorant, the specific compound may be added to the aqueous dispersion (the colorant aqueous dispersion of the water-insoluble polymer particles containing a colorant or the aqueous dispersion of the crosslinked water-insoluble polymer particles containing a colorant), or vice versa. The mixing temperature is preferably from 5 to 50° C. After the mixing, the resultant mixture may be redispersed by the same dispersion method described above.

In the aqueous dispersion of the water-insoluble polymer particles containing a colorant (or of the crosslinked water-insoluble polymer particles) in the invention, at least some amount of the specific compound is contained in the water-insoluble polymer particles; therefore, the aqueous dispersion contains a water-insoluble polymer particles containing the specific compound and a colorant.

Method of Producing Ink Composition

The method of producing the ink composition according to the invention is not particularly limited, and preferred examples thereof include a method including the following processes (1) to (4), and a method of including a water-insoluble polymer in at least one of (i) a solution in which a colorant is dissolved or (ii) an aqueous medium, and then contacting the solution and the aqueous medium with each other so as to allow colorant particles to precipitate (the latter method is hereinafter referred to as "build-up method" in some cases).

Process (1): dispersing a mixture containing a water-insoluble polymer (or a crosslinked water-insoluble polymer), an organic solvent, a colorant and water Process (2): removing the organic solvent, thereby obtaining a colorant aqueous dispersion of water-insoluble polymer particles containing the colorant Process (3): subjecting the colorant aqueous dispersion obtained in process (2) to centrifugal separation, thereby obtaining a precipitation Process (4): redispersing the precipitation obtained in process (3) in an aqueous medium Although a colorant aqueous dispersion of water-insoluble polymer particles containing the colorant can be obtained through processes (1) and (2), a colorant aqueous dispersion is preferably prepared by processes including process (3) from the viewpoints of improving jettability (stability and recoverability), removability, and jetting stability after long-term storage, as well as reducing the amount of free polymer. It is preferred to perform process (4) from the viewpoints of reducing the amount of solid content, suppressing adhesion of the ink onto a water-repellent member used in an ink head nozzle, and further improving removability.

As used herein, "aqueous dispersion of water-insoluble polymer particles containing a colorant" refers to a dispersion in which water-insoluble polymer particles containing a colorant are dispersed in a medium containing water as a main component.

Process (1)

In process (1), it is preferred to obtain an oil-in-water dispersion by a method including dissolving the water-insoluble polymer in an organic solvent, and subsequently adding and mixing thereinto a colorant, water and, optionally, at least one of a neutralizer, a surfactant or the like.

In this mixture, the content of colorant is preferably from 5 to 50% by mass, and more preferably from 10 to 40% by mass; the content of organic solvent is preferably from 10 to 70% by mass, and more preferably from 10 to 50% by mass; the content of water-insoluble polymer is preferably from 2 to 40% by mass, and more preferably from 3 to 20% by mass; and the content of water is preferably from 10 to 70% by mass, and more preferably from 20 to 70% by mass.

When the water-insoluble polymer has a salt-forming group, a neutralizer is preferably used. The degree of neutralization when using the neutralizer for neutralization is not particularly limited. Typically, the finally obtained aqueous dispersion is preferably neutral, for example, with a pH of from 4.5 to 10. It is also possible to determine the pH according to the desired degree of neutralization of the water-insoluble polymer. Examples of the neutralizer include the aforementioned examples. The water-insoluble polymer may be neutralized in advance.

Examples of the organic solvent include alcohol solvents such as ethanol, isopropanol or isobutanol; ketone solvents such as acetone, methyl ethyl ketone, methyl isobutyl ketone or diethyl ketone; and ether solvents such as dibutyl ether, tetrahydrofuran or dioxane. An amount of organic solvent that dissolves in 100 g of water at 20° C. is preferably 5 g or more, more preferably 10 g or more, more specifically preferably from 5 to 80 g, and further preferably from 10 to 50 g. In particular, methyl ethyl ketone and methyl isobutyl ketone are preferred.

The method of dispersing the mixture in process (1) is not particularly limited. Although the water-insoluble polymer particles may be fined to have a desired average particle diameter by only the main dispersing treatment, the average particle diameter of the water-insoluble polymer particles is preferably adjusted to a desired particle diameter by performing a preliminary dispersing treatment, and then performing the main dispersing treatment while applying shear force to the particles. The dispersing treatment(s) in process (1) is preferably performed at 5 to 50° C., and more preferably at 10 to 35° C.

The preliminary dispersing treatment of the mixture may be conducted by using a commonly-used mixing/stirring apparatus such as an anchor wing. Among these mixing/stirring apparatuses, a high-speed mixing/stirring apparatus such as ULTRADISPER (trade name, available from Asada Iron Works, Co., Ltd), EBARA MILDER (trade name, available from Ebara Corporation) or TK HOMOMIXER (trade name, available from Primix Corporation) is preferably used.

Examples of devices for applying shear force during the main dispersing treatment include a kneading machine such as a roll mill, a bead mill, a kneader or an extruder, a homo-valve-type high-pressure homogenizer represented by as a high-pressure homogenizer (trade name, available from Izumi Food Machinery Co., Ltd.) and MINILAB 8.3H (trade name, available from Rannie) and a chamber-type high-pressure homogenizer such as MICROFLUIDIZER (trade name, available from Microfluidics) or NANOMIZER (trade name, available from Nanomizer Inc.) These devices may be used in combination of two or more kinds thereof. Among these devices, a high-pressure homogenizer is preferred from the viewpoint of reducing the particle size of colorant when the colorant is used.

Process (2)

In process (2), an aqueous dispersion of water-insoluble polymer particles containing a colorant may be obtained by making the dispersion aqueous by distilling away the organic solvent from the obtained dispersion by a known process. The organic solvent in the obtained aqueous dispersion containing water-insoluble polymer particles is preferably substantially removed, but the organic solvent may remain in the dispersion as long as the object of the invention is not impaired. As necessary, the organic solvent may be further removed after performing the centrifugal separation in process (3). The amount of remaining organic solvent is preferably 0.1% by mass or less, and more preferably 0.01% by mass or less, relative to the aqueous dispersion.

The obtained aqueous dispersion of water-insoluble polymer particles containing a colorant is formed from water as a main medium and a solid component—water-insoluble polymer particles that contain a colorant—are dispersed in the water. The configuration of the water-insoluble polymer particles is not particularly limited as long as the particles are formed from the colorant and the water-insoluble polymer, and examples thereof include particles in which the colorant is encapsulated in the water-insoluble polymer, particles in which the colorant is uniformly dispersed in the water-insoluble polymer, and particles in which the colorant is exposed at the surface of polymer particles.

Process (3)

In process (3), the aqueous dispersion of water-insoluble polymer particles containing a colorant obtained in process (2) is subjected to centrifugal separation in order to separate the aqueous dispersion into a supernatant liquid and a precipitation, and the precipitation is taken out. The aqueous dispersion of water-insoluble particles containing a colorant, which is used as a starting material in process (3), is not limited to an aqueous dispersion obtained through processes (1) and (2), but may be an aqueous dispersion obtained by a common method such as acid precipitation.

In the aqueous dispersion that is used as a starting material in process (3), there are polymers that are not adsorbed to the colorant, polymer particles that do not contain the colorant, polymers having a tendency toward liberation such as polymers that are adsorbed to the colorant with weak adsorption force, and therefore tend to be detached from the colorant due to a vehicle component in the ink (also collectively referred to as "free polymer"), and the like. By performing centrifugal separation, the amount of free polymer can be reduced. It is thought that the free polymer, if not removed, adheres onto nozzles and causes misdirected printing or streaks, defective jetting and defective cleaning The centrifugal acceleration during the centrifugal separation in process (3) is preferably 2,000 G or higher, more preferably 3,000 G or higher, and further preferably 4,000 G or higher, from the viewpoint of reducing the amount of polymer having a tendency toward liberation or the like, and from the same viewpoint, the centrifugal acceleration is preferably 150,000 G or less, more preferably 140,000 or less, and further preferably 130,000 G or less. In view of the above, the centrifugal acceleration is preferably from 2,000 to 150,000 G, more preferably from 3,000 to 140,000 G, and further preferably from 4,000 to 130,000 G.

As used herein, the centrifugal acceleration is represented by a value obtained by dividing the following value a calculated from Formula (5) by gravitational acceleration (9.8 m/s$^2$).

$$a[m/s^2]=N^2 \times \pi^2 \times r/900 \quad \text{Formula (5)}$$

(in Formula (5), N represents the number of rotations per minute (min$^{-1}$), r represents a radius to the tip of rotation (m), and π represents a circular constant.)

The product of the centrifugal acceleration and the treatment time is preferably 2,000 G·hr or more, more preferably 3,000 G·hr or more, and further preferably 4,000 G·hr or more, from the viewpoint of reducing the amount of polymer having a tendency toward liberation or the like, and from the same viewpoint, the product of the centrifugal acceleration and the treatment time is preferably 450,000 G·hr or less, more preferably 420,000 G·hr or less, and further preferably 390,000 G·hr or less. In view of the above, the product of the centrifugal acceleration and the treatment time is preferably from 2,000 to 450,000 G·hr, more preferably from 3,000 to 420,000 G·hr, and further preferably from 4,000 to 390,000 G·hr.

As the centrifugal separation apparatus, a centrifugal settler, in which a rotation bowl having no pores is rotated at high speed so as to allow a suspending substance to be centrifugally settled, is suitably used. Examples of the centrifugal settler include those of centrifugal settling tube-type, cylinder-type, separation plate-type, basket-type, screw decanter-type, and the like (refer to, for example, "Kagaku-souchi Bin-ran (Handbook of Chemical Equipments)", edited by Society for Chemical Engineers, Japan, 2nd printing of revised 2nd edition, Maruzen Co., Ltd., Apr. 5, 1996, page 798).

Process (4)

In process (4), the precipitation obtained in process (3) is redispersed in an aqueous medium. The redispersion is preferably carried out by performing a dispersing treatment after adding water to the obtained precipitation. The method of performing dispersing is the same as that described in process (1). As used herein, "aqueous medium" includes water substantially as a main component, but solvents or additives for use in inks may be also included therein.

Build-Up Method

In the following, the buildup method is described. In an embodiment of the invention, the ink composition may be produced by: preparing an aqueous medium and a solution in which a colorant is dissolved, at least one of the aqueous medium or the solution containing the water-insoluble polymer; and contacting the solution and the aqueous medium with each other to precipitate colorant particles (hereinafter, this embodiment may be referred to as "first embodiment"). In another embodiment, the ink composition may be produced by: preparing an aqueous medium and a solution in which a colorant is dissolved, at least one of the aqueous medium or the solution containing a dispersant; contacting the solution and the aqueous medium with each other to precipitate colorant particles; and polymerizing the polymerizable compound so as to deposit on the colorant particles, thereby obtaining a colorant aqueous dispersion of water-insoluble polymer particles containing a colorant (hereinafter, this embodiment may be referred to as "second embodiment"). Herein, when the colorant is dissolved, the dissolution is preferably performed in the presence of an alkali or an acid depending on the purpose of dissolution.

The solvent in which the colorant is dissolved is preferably a solvent having a degree of solubility of 5% by mass or higher with respect to water, and more preferably a solvent that freely mix with water. Specific examples of preferred solvents include dimethyl sulfoxide, dimethylimidazolidinone, sulfolane, N-methylpyrrolidone, dimethylformamide, acetonitrile, acetone, dioxane, tetramethyl urea, hexamethyl phosphoramide, hexamethyl phosphorotriamide, pyridine, propionitrile, butanone, cyclohexanone, tetrahydrofuran, tetrahydropyran, ethyleneglycol diacetate and γ-butyrolactone. Among these, dimethylsulfoxide, N-methylpyrrolidone, dimethylformamide, dimethylimidazolidinone, sulfolane, acetone, acetonitrile and tetrahydrofuran are preferred. Examples of acidic solvents include concentrated sulfuric acid, phosphoric acid, concentrated hydrochloric acid, concentrated nitric acid and methane sulfonic acid, and among which concentrated sulfuric acid and methane sulfonic acid are preferred. These solvents may be used alone or in combination of two or more kinds.

The proportion of the solvent that dissolves the colorant is not particularly limited, but in order to achieve even more favorable dissolved state of the colorant, ease of formation of the desired particle diameter, and even more favorable color density of the aqueous dispersion, the solvent is preferably used in an amount of from 2 to 500 parts by mass, and more preferably from 5 to 100 parts by mass, with respect to 1 part by mass of the colorant.

The aqueous medium is water alone or a mixed solvent of water and an organic solvent that is soluble in water. The organic solvent is preferably added when it is not possible to dissolve the pigment or the dispersant uniformly by using water alone, or when it is not possible to obtain a certain degree of viscosity that is necessary to pass through the path by using water alone.

The manner of mixing the aqueous medium and the solution in which the colorant is dissolved is not particularly limited, and examples thereof include a method in which the solution containing the colorant is added to the aqueous medium while stirring the aqueous medium, and a method in which the solution and the aqueous medium are allowed to flow, in the same longitudinal direction, through respective flow channels having certain lengths, and colorant microparticles are allowed to precipitate by contact between the solution and the aqueous medium while passing through the flow channels. In the former case (the method of stirring and mixing), the addition is preferably conducted by in-liquid addition in which the solution containing the colorant is added to the aqueous medium by introducing a supply tube or the like into the aqueous medium. More specifically, the in-liquid addition may be performed by using a device described in paragraphs [0036] to [0047] of International Publication No. WO2006/121018. In the latter case (the method in which the solution and the aqueous medium are mixed using the flow channels), for example, a microreactor described in paragraphs [0049] to [0052] and FIGS. 1 to 4 of JP-A No. 2005-307154 or paragraphs [0044] to [0050] of JP-A No. 2006-78637 may be used.

Polymerizable compounds that can be used in the method according to the second embodiment is, for example, a compound which has a polymerizable moiety, is capable of dissolving in the solvent used for dissolving the colorant, and is capable of polymerizing to deposit on the colorant-containing particles. The polymerizable compound is preferably a monomer for use in radical polymerization or ion polymerization.

The type of the monomer is not particularly limited as long as the effect of the invention can be obtained. Specific examples of the monomer include: α-olefin aromatic hydrocarbons having 8 to 20 carbon atoms, such as styrene, 4-methylstyrene, 4-ethylstyrene, styrene sulfonate or salts thereof; vinyl esters having 3 to 20 carbon atoms, such as vinyl formate, vinyl acetate, vinyl propionate, or isopropenyl acetate; halogen-containing vinyl compounds having 2 to 20 carbon atoms, such as vinyl chloride, vinylidene chloride, vinylidene fluoride, tetrafluoroethylene, or tetrachloroethylene; olefin carboxylic acids having 4 to 20 carbon atoms and esters thereof, such as methacrylic acid and salt thereof, methyl methacrylate, ethyl methacrylate, propyl methacrylate, butyl methacrylate, 2-ethylhexyl methacrylate, stearyl methacrylate, acrylic acid and salt thereof, methyl acrylate, ethyl acrylate, butyl acrylate, 2-ethylhexyl acrylate, lauryl methacrylate, stearyl acrylate, methyl itaconate, ethyl itaconate, maleic acid and salt thereof, maleic anhydride, methyl maleate, ethyl maleate, fumaric acid and salt thereof, methyl fumarate, ethyl fumarate, crotonic acid and salt thereof, methyl crotonate, or ethyl crotonate; cyano-containing vinyl compounds having 3 to 20 carbon atoms, such as acrylonitrile, methacrylonitrile, or allyl cyanide; vinyl amide compounds having 3 to 20 carbon atoms, such as acrylamide, methacrylamide, 2-acrylamide-2-methylpropane sulfonate and salts thereof; olefin aldehydes having 3 to 20 carbon atoms, such as acrolein or crotonaldehyde; vinyl aromatic amines having 8 to 20 carbon atoms, such as 4-vinylpyridine or 4-vinylaniline; olefin phenols having 8 to 20 carbon atoms, such as 4-vinyl phenol; and diene compounds having 4 to 20 carbon atoms, such as butadiene or isoprene. In addition, the monomer may be selected from other polyfunctional monomers and macromonomers, and other known monomers and derivatives thereof. One type of polymerizable compound may be used, or two or more polymerizable compounds may be used. The ratio of the polymerizable compound to be used is not particularly limited as long as the object of the invention is achieved; however, the polymerizable compound is preferably used in an amount of from 0.001 to 10 parts by mass, and more preferably from 0.005 to 2.0 parts by mass, with respect to 1 part of the colorant, from the viewpoints of further improving the dispersion stability of the colorant-containing particles and color density when the colorant-containing particles are formed into an water dispersion.

When using a polymerizable compound which also acts as a dispersant described below, the amount of a polymerizable compound is such that the polymerizable compound can also acts as the dispersant while the effect due to the added polymerizable compound is imparted. When a polymerizable compound which requires a dispersant and a polymerizable compound which also acts as a dispersant are used in combination, it is preferable that the total amount thereof fall within the above-described ranges.

The dispersant which is added to the colorant solution in the method according to the second embodiment is preferably selected from those usable in the method of the first embodiment. However, the dispersant may be water-soluble, in which case the polymer formed by the polymerization in the polymerization step of the method according to the second embodiment should be water-insoluble; and a reactive emulsifier may be used as a dispersant. The reactive emulsifier is a compound that can be used as the polymerizable compound, and can provide functions as a dispersant and a polymerizable compound at the same time, resulting in reduction in the number of components to be used. However, a combination of a polymerizable compound and a reactive emulsifier that can act as a dispersant may be used, or a combination of a reactive emulsifier, a polymerizable compound, and a dispersant may be used. The amount of the dispersant to be added is selected from the ranges of the water-insoluble polymer amount described above, and when a polymerizable compound which can act as a dispersant and a dispersant that is not polymerizable are used in combination, is it preferable that the total amount thereof fall within the ranges of the water-insoluble polymer amount described above.

The polymerizable compound that can act as a dispersant is a compound that can impart dispersibility to a colorant-containing particles formed by mixing a colorant solution and water. Preferable examples thereof include a reactive emulsifier having a hydrophobic moiety, a hydrophilic moiety, and a polymerizable moiety in a same molecule thereof, and the hydrophilic moiety is preferably formed from at least one of a carboxylic acid group, a sulfonic acid group, a phosphoric acid group, a hydroxyl group, or an alkylene oxide. The reactive emulsifier is not particularly limited as long as the object of the invention is achieved. Specific examples thereof include: monomers of vinyl ethers having various polyether chain at a side chain thereof, such as vinyl sulfonate, 4-vinylbenzene sulfonate, allyl sulfonate, 3-(meth)acryloyloxy propane sulfonate, 2-methylallyl sulfonate, 2-(meth)acryloyloxy ethane sulfonate, 2-acrylamide-2-methylpropane sulfonate, mono {2-(meth)acryloyloxyethyl}acid phosphate, sulfuric acid ester of allyl alcohol and salts thereof, polyoxyethylene alkyl ether, polyoxyethylene higher aliphatic acid ester, or polyoxyethylene alkyl phenyl ether; monomers of allyl ethers; monomers of acrylic acid esters; and monomers of methacrylic acid esters. Representative examples of commercially-available reactive emulsifiers include: ADEKA REASOAP SE-10N, ADEKA REASOAP SE-20N, ADEKA REASOAP SE-30N, ADEKA REASOAP NE-10, ADEKA REASOAP NE-20, ADEKA REASOAP NE-30 (all trade names, manufactured by ADEKA Corporation); AQUALON HS-05, AQUALON HS-10, AQUALON HS-20, AQUALON HS-30, AQUALON HS-3330PL, AQUALON RN-10, AQUALON RN-20, AQUALON RN-30, AQUALON RN-50 (all trade names, manufactured by Dai-ichi Kogyo Seiyaku Co., Ltd.); LATEMUL S-120, LATEMUL S-120A, LATEMUL S-180, LATEMUL S-180A, LATEMUL ASK (all trade names, manufactured by Kao Corporation); ELEMINOL JS-2, ELEMINOL RS-30 (all trade names, manufactured by Sanyo Chemical Industries Ltd.); RMA-564, RMA-568, RMA-1114, ANTOX MS-60, ANTOX MS-2N, RN-1120, and RA-2614 (all trade names, manufactured by Nippon Nyukazai Co., Ltd.). One of the reactive emulsifiers may be used singly, or a combination of two or more of them may be used.

In the method according to the second embodiment, the polymerization initiator described above may be used. The polymerization initiator may be added to either of water used for preparing a colorant solution or a solvent that dissolves the colorant, or may be added to both of them. Various types of polymerization such as radical polymerization or ion polymerization may be used; however, radical polymerization is suitably used from the viewpoints of handleability, handiness, and wide variety of the polymerizable compound that can be used. The polymerization may be initiated and/or promoted by heat or light, or a combination of them. Alternatively, a polymerization initiator that generates an active species by heat or light, or a combination of them may be used.

The build-up method preferably includes heating the colorant-containing particles after the formation of the same. The objects of introduction of heating include the effects described in Japanese Patent No. 3936558, the effect of obtaining colorant-containing particles having a stable crystal structure, i.e., Ostwald ripening, and the like. By performing this treatment, the viscosity of the dispersion can be decreased, and dispersion stability can be improved.

The heating is preferably carried out at 30 to 110° C. with a heating time of from 10 to 360 minutes. The heating is preferably carried out after obtaining a dispersion in which microparticles are formed by mixing the water-insoluble colorant solution and the aqueous medium.

In the build-up method, mildly-flocculated bodies in which microparticles of the colorant are redispersibly flocculated can be formed using the dispersion including water, colorant particles and water-insoluble polymer. The mildly-flocculated bodies can be separated from the dispersion. Further, by imparting redispersibility to the mildly-flocculated bodies, the flocculation can be canceled and the colorant-containing particles can be redispersed in a redispersion medium.

The following are details of the process of forming mildly-flocculated bodies in which particles of colorant are redispersibly flocculated and separating the mildly-flocculated bodies from the dispersion, and details of the process of redispersing the colorant-containing particles by canceling the flocculation of the flocculated bodies.

As described below, the flocculated bodies of particles are preferably formed by treating a mixed solution in which colorant-containing particles are precipitated with an acid, preferably by adding an acid during the formation of the flocculated bodies. The treatment using an acid preferably includes allowing the particles to flocculate by using an acid and separating the same from the solvent (dispersion medium), condensing the same, removing the solvent, and desalting (removal of acid) the same. By making the system acidic, the degree of electrostatic repulsion force derived from acidic hydrophilic portions can be decreased, and therefore the particles can be flocculated.

The acid used here is not particularly limited as long as it allows microparticles which are hard to precipitate to flocculate to form slurry, paste, powder, particles, cake (mass), sheets, short fibers, flakes or the like, and then efficiently separate the same from the solvent by an ordinary separation method. It is more preferred to use an acid that forms a water-soluble salt with an alkali, and the acid in itself is preferably highly soluble in water. In order to efficiently carrying out the desalting, the amount of acid to be added is preferably as small as possible within a range in which the particles can flocculate. Specific examples of the acid include hydrochloric acid, sulfuric acid, nitric acid, acetic acid, phosphoric acid, trifluoroacetic acid, dichloroacetic acid and methane sulfonic acid. Among these, hydrochloric acid, acetic acid and sulfuric acid are particularly preferred. The aqueous dispersion liquid of pigment particles capable of being easily separated with an acid, can be readily separated by using a centrifuge, a filtration apparatus, a slurry solid-liquid separator, or the like. During the separation, the degree of desalting or solvent removal may be adjusted by adding water as a diluent, or by increasing the number of decantation and washing with water. When performing the flocculation, an inorganic compound such as alum, and/or a polymer flocculating agent may be further used.

The flocculated bodies obtained in the above may be used directly as paste or slurry with high water content, or as necessary, the flocculated bodies may be used as microparticles formed through a drying method such as spray drying, centrifugal separation drying, filtration drying or freeze drying.

One example of the redispersion treatment is an alkali treatment. Specifically, the particles that are allowed to flocculate by using an acid are preferably neutralized with an alkali and redispersed in water or the like, while the particles maintain the primary particle diameter at the time of precipitation. Since the desalting and the solvent removal are already performed, a concentrated base material that includes a low amount of impurities can be obtained. The alkali used here is not particularly limited, as long as it functions as a neutralizer with respect to a dispersant having an acidic hydrophilic portion and increases the solubility in water. Specific examples of the alkali include organic amines such as aminomethyl propanol, dimethylamino propanol, dimethylethanolamine, diethyltriamine, monoethanolamine, diethanolamine, triethanolamine, butyldiethanolamine or morpholine, hydroxides of an alkali metal such as sodium hydroxide, lithium hydroxide or potassium hydroxide, and ammonia. These compounds may be used alone or in combination of two or more kinds.

The amount of the alkali to be used is not particularly limited as long as the flocculated particles can be stably redispersed in water. However, when an alkali is used for printing inks or inks for an inkjet printer, the amount thereof is preferably such that the value of pH is adjusted to be from 6 to 12, and more preferably from 7 to 11, since the alkali may cause corrosion of members of the printer.

Further, a method other than the alkali treatment may be employed depending on the type of the dispersant used in the particle precipitation, and examples thereof include redispersion treatments in which a known low-molecular dispersant or a known high-molecular dispersant is used. These redispersion treatments may be performed in combination with the alkali treatment.

Further, during redispersing the flocculated particles, it is possible to facilitate the redispersion by adding a water-soluble organic solvent as a medium for redispersion. The organic solvent that may be specifically used is not particularly limited, and examples thereof include lower alcohols such as methanol, ethanol, n-propanol, isopropanol, n-butanol, isobutanol or tert-butanol, aliphatic ketones such as acetone, methyl ethyl ketone, methyl isobutyl ketone or diacetone alcohol, ethylene glycol, diethylene glycol, triethylene glycol, glycerin, propylene glycol, ethylene glycol monomethyl-or-monoethyl ether, propylene glycol methyl ether, dipropylene glycol methyl ether, tripropylene glycol methyl ether, ethylene glycol phenyl ether, propylene glycol phenyl ether, diethylene glycol monomethyl-or-monoethyl ether, diethylene glycol monobutyl ether, triethylene glycol monomethyl-or-monoethyl ether, N-methylpyrrolidone, 2-pyrrolidone, dimethyl formamide, dimethyl imidazolidinone, dimethyl sulfoxide and dimethyl acetamide. These compounds may be used alone or in combination of two or more kinds. Further, when preparing an aqueous dispersion by redispersing the pigment particles, the amount of water is preferably from 20 to 99% by mass, and more preferably from 30 to 95% by mass. The amount of water-soluble organic solvent is preferably from 0.1 to 50% by mass, and more preferably from 0.5 to 30% by mass.

When water, alkali or water-soluble organic solvent is added to the flocculated particle, a dispersing machine such as a stirrer, a mixer, a sand mill, a bead mill, a ball mill or a dissolver, or an ultrasonic dispersing machine may be used as necessary. In particular, when a paste or slurry of organic pigment with high water content is used, water is not necessarily added. Further, for the purposes of increasing the efficiency of redispersion or removing unnecessary water-soluble organic solvent, excess alkali or the like, heating, cooling, distillation or the like may be performed.

The dispersion obtained by the build-up method exhibits excellent dispersion stability and includes a significantly low amount of free polymer, and is therefore suitably used for the ink composition according to the invention.

Further, agents that are commonly used such as a wetting agent, a penetrant, a dispersant, a viscosity adjuster, a deforming agent, an antifungal agent and an antirust agent may be added to the ink composition according to the invention.

The water content of the ink composition according to the invention is preferably from 30 to 90% by mass, and more preferably from 40 to 80% by mass. The surface tension of the ink composition (20° C.) is preferably from 25 to 50 mN/m, and more preferably from 27 to 45 mN/m.

The viscosity of the ink composition according to the invention (20° C.) is preferably from 2 to 12 mPa·s, more preferably from 2.5 to 10 mPa·s, and further preferably from 2.5 to 6 mPa·s, from the viewpoint of maintaining favorable jettability. The measurement of viscosity may be carried out by using an E-type viscometer (RE80, trade name, available from Toki Sangyo CO., Ltd.) at a measurement temperature of 20° C., a measurement time of 1 minute, and a number of rotation of 100 rpm, with the use of a standard-type rotor (1°34'×R24).

Ink Set

The ink set according to the invention includes at least one kind of the ink composition according to the invention. Embodiments of the ink set according to the invention include the following (1) to (3).

(1) a combination of plural ink compositions having different colors that can be used for the formation of a multicolor image (for example, a full-color image)

(2) a combination of at least one kind of ink composition and at least one kind of treatment liquid that can form an aggregate when having contact with the ink composition (3) a combination of (1) and (2)

The ink set according to the invention is used for an image formation method in which the aforementioned ink composition is used, preferably for an image formation method described below. In the following, details of embodiments (1) and (2) are described.

Embodiment (1): The ink set formed from a combination of plural ink compositions having different colors preferably includes a magenta color ink, a cyan color in and a yellow color ink, in order to form a full-color image. In order to adjust the color hue, a black color ink may further be included. Further, inks of other colors than yellow, magenta and cyan, such as red, green, blue and white, and specific color inks (for example, a colorless ink) that are used in the field of printing are also applicable.

The ink compositions of these plural colors may be prepared by appropriately selecting the colorant in the preparation of the ink composition according to the invention.

Embodiment (2): This is an embodiment including at least one kind of ink composition according to the invention and at least one kind of treatment liquid that can form an aggregate when having contact with the ink composition.

Treatment Liquid

The treatment liquid is an aqueous composition that can form aggregate when having contact with the ink composition. Specifically, the treatment liquid at least includes an aggregating component that can form an aggregate when mixed with the ink composition, by allowing particles dispersed in the ink composition such as colorant particles (pigment or the like) to aggregate. The treatment liquid may further include another component, as necessary. By using the treatment liquid together with the ink composition, the speed of inkjet recording can be increased, and an image with high density and high resolution can be obtained even when high-speed recording is performed.

Aggregating Component

The treatment liquid includes at least one kind of aggregating component that can form an aggregate when having contact with the ink composition. By mixing the treatment liquid with the ink composition that has been jetted by an inkjet method, aggregation of a pigment or the like that is stably dispersed in the ink composition is promoted.

Examples of the treatment liquid include a liquid composition capable of forming aggregates by changing the pH of an ink composition. At this time, the pH (25 C.°±1° C.) of the treatment liquid is preferably from 1 to 6, more preferably from 1.2 to 5 and still more preferably from 1.5 to 4, from the viewpoint of the aggregating speed of the ink composition. In this case, the pH (25 C.°±1° C.) of the ink composition used in a jetting process is preferably from 7.5 to 9.5 (more preferably from 8.0 to 9.0).

In particular, in the invention, it is preferable that an ink composition having a pH (25 C.°) of 7.5 or more, and a treatment liquid having a pH (25 C.°) of from 3 to 5 from the viewpoint of an image density, a resolution and a higher speed of inkjet recording.

One kind of the aggregating component may be used singly, or two or kinds of the aggregating components may be used mixed and used.

The treatment liquid may be formed using at least one of acidic compound as an aggregating component. Examples of the acidic compound include a compound having a phosphoric acid group, a phosphonic acid group, a phosphinic acid group, a sulfuric acid group, a sulfonic acid group, a sulfinic acid group, and a carboxyl group, and a salt thereof (for example, polyvalent metal salt). Among them, a compound having a phosphoric acid group or a carboxyl group is preferable, and a compound having a carboxyl group is more preferable, from the viewpoint of aggregating speed of the ink composition.

The compound having a carboxyl group is preferably selected from polyacrylic acid, acetic acid, glycolic acid, malonic acid, malic acid, maleic acid, ascorbic acid, succinic acid, glutaric acid, fumaric acid, citric acid, tartaric acid, lactic acid, pyrrolidone carboxylic acid, pyrone carboxylic acid, pyrrole carboxylic acid, furan carboxylic acid, pyridine carboxylic acid, coumalic acid, thiophene carboxylic acid, nicotinic acid, or a derivative of these compounds or a salt (for example, polyvalent metal salt) of these compounds. One kind of these compounds may be used singly, or two or kinds of these compounds may be used together.

The treatment liquid in the invention may include an aqueous solvent (for example, water) in addition to the acidic compound.

The content of the acidic compound in the treatment liquid is preferably from 5% by mass to 95% by mass, more preferably from 10% by mass to 80% by mass, relative to a total mass of the treatment liquid, from the viewpoint of an aggregation effect.

Further, a polyvalent metal salt or a polyallylamine may be added to the treatment liquid, from the viewpoint of improving high-speed aggregation. Examples of the polyvalent metal salt include salts of alkali earth metals (for example, magnesium and calcium) from the second group of the Periodic Table, salts of transition metals (for example, lanthanum) from the third group of the Periodic Table, salts of metals (for example, aluminum) of the 13th group of the Periodic Table, and salts of lanthanides (for example, neodymium). Examples of the polyallylamine include polyallylamine and a derivative of polyallylamine. As metal salts, a carboxylate salt (a formate salt, an acetate salt, a benzoate salt or the like), a nitrate salt, a chloride salt and a thiocyanate salt are suitable. In particular, a calcium salt or a magnesium salt of carboxylic acids (formic acid, acetic acid, benzoic acid and the like), a calcium salt or a magnesium salt of nitric acid, calcium chloride, magnesium chloride, and a calcium salt or a magnesium salt of thiocyanic acid are preferable.

The content of the metal salt in the treatment liquid is preferably in the range of from 1% by mass to 10% by mass, more preferably in the range of from 1.5% by mass to 7% by mass, and still more preferably in the range of from 2% by mass to 6% by mass.

The viscosity of the treatment liquid is preferably in the range of from 1 mPa·s to 30 mPa·s, more preferably in the range of from 1 mPa·s to 20 mPa·s, still more preferably in the range of from 2 mPa·s to 15 mPa·s, and particularly preferably in the range of from 2 mPa·s to 10 mPa·s, from the viewpoint of aggregation speed of an ink composition.

In addition, the viscosity is measured with VISCOMETER TV-22 (trade name; manufactured by Toki Sangyo Co., Ltd.) under a condition of a temperature of 20° C.

Moreover, the surface tension of the treatment liquid is preferably from 20 mN/m to 60 mN/m, more preferably from 20 mN/m to 45 mN/m, and still more preferably from 25 mN/m to 40 mN/m, from the viewpoint of ink aggregation speed. In addition, the surface tension is measured with AUTOMATIC SURFACE TENSIOMETER CBVP-Z (trade name; manufactured by Kyowa Interface Science Co., Ltd.) under a condition of a temperature of 25° C.

Image Formation Method

The image formation method according to the invention includes forming an image by jetting the ink composition according to the invention or the ink composition of the ink set according to the invention, from plural jetting ports (hereinafter, also referred to as "nozzles") that are arranged in a two-dimensional matrix (hereinafter, also referred to as "ink jetting process"). As necessary, the method may include other processes.

In the image formation method according to the invention, particularly because of the use of the ink composition according to the invention, occurrence of nozzle clogging due to the ink composition may be suppressed, thereby achieving excellent jetting stability and removability.

Ink Jetting Process

In the ink jetting process, an image is formed by jetting the ink composition using an inkjet head having a nozzle plate. In this process, a desired visual image can be formed by selectively applying the ink composition to a recording medium.

Specifically, the image recording utilizing an inkjet method can be performed by jetting, onto a desired recording medium, a liquid composition using application of energy. The desired recording medium may be plain paper, resin coated paper, paper exclusively used for inkjet recording described in JP-A Nos. 8-169172, 8-27693, 2-276670, 7-276789, 9-323475, 62-238783, 10-153989, 10-217473, 10-235995, 10-337947, 10-217597, and 10-337947, film, paper for common use in inkjet and electrophotographic recording, cloth, glass, metal, ceramics or the like. In addition, as the inkjet recording method which is preferably used for the invention, the method described in paragraph Nos. [0093] to [0105] of JP-A No. 2003-306623 can be used.

The inkjet method is not particularly restricted. However, any known methods, for example, a charge control system of jetting an ink by utilizing an electrostatic attractive force; a drop-on-demand system (pressure pulse system) of jetting an ink by utilizing the vibration pressure of a piezoelectric element; an acoustic inkjet system of converting electric signals into acoustic beams, irradiating them to an ink, and jetting the ink by utilizing radiation pressure; or a thermal inkjet (BUBBLEJET (registered trade mark)) system of jetting the ink by utilizing a pressure generated by bubbles formed by heating an ink, may be used.

In addition, the inkjet methods include a system of jetting a large number of small-volume of ink droplets of low concentration ink called photo ink, a system of improving image quality using plural kinds of inks of substantially identical hue and different densities, and a system of using a colorless and transparent ink.

The inkjet head used in the inkjet method may be either an on-demand head or a continuous head. The jetting system is not particularly limited, and specific examples thereof include electromechanical conversion systems (for example, a single cavity type, a double cavity type, a vendor type, a piston type, a shared mode type and a shared wall type), electrothermal conversion systems (for example, a thermal inkjet type and a BUBBLE JET (trade name) type), electrostatic suction systems (for example, an electric-field control type and slit jet type) and discharging systems (for example, a spark jet type). The type of ink nozzles or the like used for the recording by the inkjet method is not particularly limited, and may be appropriately selected according to purposes.

The inkjet method is preferably a line method (single-pass method) of using a line head in which recording elements are positioned so as to cover the whole region corresponding to one side of a recording medium, from the viewpoint of achieving remarkable effects of the invention in terms of jetting stability and removability. In the single-pass method, an image is formed on the entire region of a recording medium by moving a full-line head, which covers the entire region of the recording medium, only once relative to the recording medium. Examples of the single-pass method are described in JP-A No. 2005-96443 and JP-A No. 2005-280346. In other words, in the single-pass method, an image can be recorded on the entire region of a recording medium by scanning the recording medium to a direction perpendicular to a direction in which the elements of the full-line head are arranged. Therefore, a conveyor system such as a carriage used for performing scanning with a shuttle head may be omitted. Further, since only the recording medium is moved without the need for controlling the complicated scan movement of the carriage and the recording medium, the speed of recording can be increased compared with a shuttle method. The image formation method according to the invention is applicable to both of these methods, but in general, the effects of improving jetting accuracy and suppressing corrosion of the nozzle plate due to contact with ink are more remarkable in the single-pass method.

Further, in the ink jetting process in the invention, when the line system is used, by using not only one kind of ink composition, but also two or more kinds of ink compositions, the ink jetting (impinging) interval between previously jetted ink composition droplet (the n th color (n≧1), for example, the second color) and the subsequently jetted ink composition droplet (the n+1 th color, for example, the third color) can be one second or less, thereby performing recording suitably. In the invention, when the ink jetting interval is one second or less using the line system, an image with excellent rubbing resistance and suppressed occurrence of blocking can be obtained at higher recording speed than previous recording speed, while preventing ink bleed or color mixing caused by interference among ink droplets. Further, an image with excellent color hue and image forming property (reproducibility of fine lines or minute portions in an image) can be obtained.

The amount of ink droplets jetted from an inkjet head is preferably from 0.5 pL to 6 pL (picoliter), more preferably from 1 pL to 5 pL, and still more preferably from 2 pL to 4 pL, from the viewpoint of obtaining a high-resolution image.

Inkjet Head

In the image formation method according to the invention, the inkjet head at least includes a nozzle plate. FIG. 1 is a schematic sectional view showing an example of internal structure of the inkjet head.

As shown in FIG. 1, inkjet head 200 includes nozzle plate 11 having jetting ports (nozzles), and ink supply unit 20 positioned to the side opposite to the jetting direction of the nozzle plate. Nozzle plate 11 includes plural jetting ports 12 from which ink is jetted.

Ink supply unit 20 includes plural pressure chambers 21 communicating with each of plural jetting ports 12 of nozzle plate 11 via nozzle communication path 22; plural ink supply paths 23 that supply ink to each of plural pressure chambers 21; common liquid reservoir 25 that supplies ink to plural ink supply paths 23; and pressure generating unit 30 that deforms each of plural pressure chambers 21.

Ink supply path 23 is formed between ink supply unit 20 and nozzle plate 11 such that ink that has been supplied to common liquid reservoir 25 is delivered. Since ink supply path 23 connects with one end of supply adjustment path 24 that connects ink supply path 23 with pressure chamber 21, it is possible to deliver ink to pressure chamber 21 from ink supply path 23 while controlling the amount of the ink to a desired amount. Plural supply adjustment paths 24 are provided to ink supply path 23, and ink is supplied to pressure chamber 21 that is positioned adjacent to pressure generating unit 30 via ink supply path 23.

In this way, a large amount of ink can be supplied to plural jetting ports.

Pressure generating unit 30 is an actuator (piezoelectric element) formed by layering, from the side of pressure chamber 21, vibration plate 31, adhesive layer 32, lower electrode 33, piezoelectric material layer 34 and upper electrode 35 in this order. Electric wirings that supply external driving signals are connected to pressure generating unit 30 so that it can be driven. The piezoelectric material layer 34 is connected to vibration plate (pressure application plate) 31 that forms the top surface of pressure chamber 21, together with the electrode. When a voltage is applied to the electrode, the actuator deforms in response to the image signals and ink is jetted from the nozzle through a nozzle communication path. After ink is jetted, fresh ink is supplied to pressure chamber 21 from common liquid reservoir 25 through ink supply path 23.

Circulation aperture 41 is provided around jetting port 12 such that ink can be collected by circulation path 42 at any time. In this way, increase in viscosity of the ink on and around jetting ports when jetting is not performed can be prevented.

Figure 2:
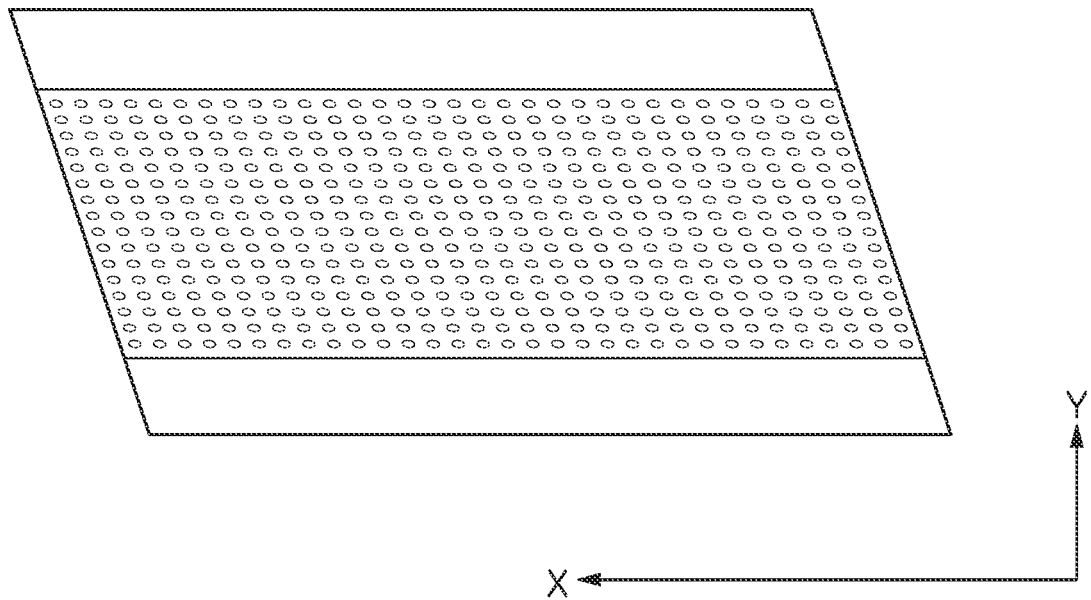
FIG. 2 is a view schematically showing an example of jetting port alignment of a nozzle plate.

As shown in FIG. 2, nozzle plate 11 has 32×60 jetting ports (nozzles) arranged in a two-dimensional manner. For example, this nozzle plate is formed from silicon and has a structure in which silicon is exposed at the inner side of nozzles and the surface of the nozzle plate from which ink is jetted. In FIG. 2, direction Y corresponds to a direction in which a recording medium is conveyed (vertical scanning direction) and direction X corresponds to the longer side of the line head (main scanning direction).

By using this nozzle plate, it is possible to record a high quality image with a resolution of as high as 1200 dpi by a high-speed single-pass method (the recording medium passes once). Specifically, the plural nozzles arranged in a two-dimensional matrix on the nozzle plate create a path structure in which ink supply units fixed on the nozzle plate can jet a large amount of ink at high frequency (i.e., jet at high duty).

Water repellent treatment of inkjet head nozzles

In the recording head, the surface of nozzles are more preferably subjected to a water repellent treatment as described in JP-A No. 2002-292878, from the viewpoint of improving jetting stability and removability. For example, a member formed from a fluorine-based resin, a fluorine-based resin plate having a monolayer structure, a member (plate) having a multilayer structure of two or more layers in which a fluorine-based resin layer is formed on the outermost surface of the support, or the like may be used.

Materials that can be used for the member formed from a fluorine-based resin or the fluorine-based resin layer include known fluorine-based resins such as a fluorocarbon resin including —$CF_2$— in its main chain and —$CF_3$ at its terminals, a fluorosilicone resin including —$SiF_2$— in its main chain and —$SiF_3$ at its terminals, and a hydrofluorocarbon resin or a hydrofluorosilicone resin formed by substituting part of fluorine atoms of the fluorocarbon resin or the fluorosilicone resin with hydrogen atoms.

More specifically, examples of the materials for the member formed from a fluorine-based resin or the fluorine-based resin layer include fluorine-based resins such as PTFE (polytetrafluoroethylene), PFA (tetrafluoroethylene perfluoroalkylvinylether copolymer), FEP (tetrafluoroethylene hexafluoropropylene copolymer) and ETFE (tetrafluoroethylene copolymer). Among these, PTFE is particularly preferred.

In the invention, water repellency refers to a property of a surface having a larger contact angle than a contact angle with respect to water, which is shown on a surface of a commonly known bulk material. Specifically, a PFA resin has the largest contact angle (approximately 115°) among the bulk materials, and the property of a surface that exhibits a larger contact angle than that of the PFA resin is referred to as super water repellency. Therefore, in the invention, the super water repellent treatment of a surface of the member formed from a fluorine-based resin or the fluorine-based resin layer refers to a treatment performed on a surface of a fluorine-based resin whereby the fluorine-based resin acquires a better water repellency than the original water repellency of the fluorine-based resin, i.e., the fluorine-based resin has a larger contact angle than the original contact angle of the resin. Accordingly, in the invention, the contact angle with respect to water is preferably 120° or more, may be 150° or more, or may be 170° or more. The upper limit of the contact angle is not particularly limited.

In the invention, the super water repellent treatment of the surface of the member formed from a fluorine-based resin or the fluorine-based resin layer is not particularly limited, as long as super water repellency can be imparted to a surface of the fluorine-based resin. Examples of treatment methods of the treatment are described in "Molded Fluororesin Object Having Modified Surface Layer, Surface Treatment of Fluororesin and Apparatus Thereof (JP-A No. 2000-17091)" or "Effects of Ar Ion Implantation on Super Water Repellency of Fluororesin (Proceedings of the 15th Symposium on Surface Layer Modification by Ion Implantation) and the like.

Recording Medium

The inkjet recording method of the invention records an image on a recording medium.

The recording medium is not particularly restricted, and general printing paper, which is mainly made of cellulose such as so-called high-quality paper, coat paper, art paper or the like used in the general offset printing, may be used.

Recording media that are generally commercially available can be used as the recording medium, and examples include high-quality paper (A) such as Prince WOOD FREE (trade name, produced by Oji Paper Co., Ltd.), SHIRAOI (trade name, produced by Nippon Paper Industries Co., Ltd.) and New NPI High Quality (trade name, produced by Nippon Paper Industries Co., Ltd.), very light-weight coated paper such as EVER LIGHT COATED (trade name, produced by Oji Paper Co., Ltd.) and AURORA S (trade name, produced by Nippon Paper Industries Co., Ltd.), light-weight coated paper (A3) such as TOPKOTE (L) (trade name, produced by Oji Paper Co., Ltd.) and AURORA L (trade name, produced by Nippon Paper Industries Co., Ltd.), coated paper (A2, B2) such as TOPKOTE PLUS (trade name, produced by Oji Paper Co., Ltd.) and AURORA COAT (trade name, produced by Nippon Paper Industries Co., Ltd.) and art paper (A1) such as KINFUJI (2/SIDE GOLDEN CASK GLOSS) (trade name, produced by Oji Paper Co., Ltd.) and TOKUBISHI ART (trade name, produced by Mitsubishi Paper Mills Limited). Further, different kinds of photographic paper for inkjet recording can be used.

EXAMPLES

Hereinafter, the invention is described in more detail by way of Examples, but the invention is not intended to be limited to these. Particularly, unless otherwise specified, the term "part" and "%" are mass basis.

Synthesis of Compound Represented by Formula (A) (Specific Compound)

Synthesis Example 1 of Specific Compound A

In a reaction vessel, 100 parts of phthalic anhydride, 400 parts of 4 mole ethylene oxide adduct of 2-ethylhexyl alcohol (trade name: NEWCOL 1004, manufactured by Nippon Nyukazai Co., Ltd.), and 0.5 part of tetraisopropoxy titanate were mixed, and the reaction vessel was sufficiently substituted with nitrogen gas, followed by heating to 220° C. to perform esterification reaction. The pressure in the reaction vessel was reduced while the temperature was maintained at 220° C., to complete the esterification reaction. Excess alcohol was removed by topping, thereby obtaining a specific compound A which was a phthalic acid diester compound.

The specific compound A had a basic structure of phthalic acid in which 4 mole ethylene oxide adducts of a 2-ethylhexyl group were bonded at both terminals of phthalic acid. The Log P value of the phthalic acid was 0.57, the Log P value of the ethylene oxide was −0.27, and the Log P value of the 2-ethylhexyl group was 3.91; therefore, the Log P value of the specific compound A calculated was 6.23 (=0.57−0.27×8+3.91×2).

Synthesis Example 2 of Specific Compound B

In a reaction vessel, 70 parts of adipic acid, 450 parts of 4 mole ethylene oxide/2 mole propylene oxide adduct of 2-ethylhexyl alcohol (manufactured by Nippon Nyukazai Co., Ltd.), and 0.5 parts tetraisopropoxy titanate were mixed, and the reaction vessel was sufficiently substituted with nitrogen gas, followed by heating to 230° C. to perform esterification reaction. The pressure in the reaction vessel was reduced while the temperature was maintained at 230° C., to complete the esterification reaction. Excess alcohol was removed by topping, thereby obtaining a specific compound B which was an adipic acid diester compound.

The specific compound B had a basic structure of adipic acid in which 4 mole ethylene oxide/2 mole propylene oxide adducts of 2-ethylhexyl alcohol were bonded at both terminals of adipic acid. The Log P value of the adipic acid was 0.29, the Log P value of the ethylene oxide was −0.27, the Log P value of the propylene oxide was 0.14, and the Log P value of the 2-ethylhexyl group was 3.91; therefore, the Log P value of the specific compound B calculated was 6.51 (=0.29−0.27×8+0.14×4+3.91×2).

The weight average molecular weights of the water-insoluble polymer and the crosslinked water-insoluble polymer were measured by the method described below.

Measurement of Weight Average Molecular Weight (Mw) of Water-Insoluble Polymer

The measurement was conducted by a gel chromatography method using polystyrene as a standard material and N,N-dimethylformamide containing 60 mmol/L of phosphoric acid and 50 mmol/L of lithium bromide as a solvent. Columns used: available from Tosoh Corporation, TSK-GEL, α-M×2), measurement device: available from Tosoh Corporation (HLC-8120GPC), flow rate: 1 mL/min.

Production of Water-Insoluble Polymer

Production of Water-Insoluble Polymer 1: Polymer Production Example 1

In a reaction vessel, 20 parts of methyl ethyl ketone, 0.11 parts of a polymerization chain transfer agent (2-mercaptoethanol), and 10% of 200 parts of respective monomers shown in Table 1 were mixed, and the reaction vessel was sufficiently substituted with nitrogen gas, thereby obtaining a liquid mixture.

Separately, the remaining 90% of the monomers shown in Table 1 were put in a drip funnel and mixed with 0.99 parts of the polymerization chain transfer agent, 60 parts of methyl ethyl ketone, and 1.2 parts of a radical polymerization initiator (2,2'-azobis(2,4-dimethylvaleronitrile)), followed by substituting with sufficient nitrogen gas, thereby obtaining a liquid mixture.

Under the nitrogen atmosphere, the liquid mixture in the reaction vessel was heated to 65° C. while stirring, and the liquid mixture in the drip funnel was added dropwise to the reaction vessel over 3 hours. After the completion of dropwise addition, the temperature of the resultant solution was maintained at 65° C. for 2 hours. Then, a solution obtained by dissolving 0.3 parts of the radial polymerization initiator in 5 parts of methyl ethyl ketone was added thereto, and the resultant solution was aged at 65° C. for 2 hours and subsequently at 70° C. for 2 hours. Then, 120 parts of methyl ethyl ketone was added thereto, and the resultant solution was stirred for 30 minutes, thereby obtaining a solution of a water-insoluble polymer 1 in which the solid content amount (effective content amount) was about 50%. The water-insoluble polymer 1 had a weight average molecular weight (Mw) of 42,000.

Production of Water-Insoluble Polymer 2: Polymer Production Example 2

In a reaction vessel, 20 parts of methyl ethyl ketone, 0.1 parts of a polymerization chain transfer agent (2-mercaptoethanol), and 10% of 200 parts of respective monomers shown in Table 1 were mixed, and the reaction vessel was sufficiently substituted with nitrogen gas, thereby obtaining a liquid mixture.

Separately, the remaining 90% of the monomers shown in Table 1 were put in a drip funnel and mixed with 0.5 parts of the polymerization chain transfer agent, 60 parts of methyl ethyl ketone, and 1.2 parts of a radical polymerization initiator (2,2'-azobis(2,4-dimethylvaleronitrile)), followed by substituting with sufficient nitrogen gas, thereby obtaining a liquid mixture.

Under the nitrogen atmosphere, the liquid mixture in the reaction vessel was heated to 65° C. while stirring, and the liquid mixture in the drip funnel was added dropwise to the reaction vessel over 3 hours. After the completion of dropwise addition, the temperature of the resultant solution was maintained at 65° C. for 2 hours. Then, a solution obtained by dissolving 0.3 parts of the radial polymerization initiator in 5 parts of methyl ethyl ketone was added thereto, and the resultant solution was aged at 65° C. for 2 hours and subsequently at 70° C. for 2 hours. Then, 120 parts of methyl ethyl ketone was added thereto, and the resultant solution was stirred for 30 minutes, thereby obtaining a solution of a water-insoluble polymer 2 in which the solid content amount (effective content amount) was about 50%. The water-insoluble polymer 2 had a weight average molecular weight (Mw) of 72,000.

TABLE 1

| | | Polymer production example 1 | Polymer production example 2 |
|---|---|---|---|
| Type of monomer (weight part of solid content) | (a) Methacrylic acid | 12 | 14 |
| | (b) Styrene macromer | 15 | 15 |
| | (c) Benzyl methacrylate | 48 | 46 |
| | (d) M-90G | 5 | 5 |
| | (e) PP-800 | 15 | 20 |

Details of the compounds shown in Table 1 were as follows.

(b) Styrene macromer: AS-6S (trade name, manufactured by Toagosei Co., Ltd.), having a number average molecular weight of 6000; and having a methacryloyloxy group as a polymerizable functional group.

(d) M-90G: NK ESTER M-90G (trade name, manufactured by Shin-Nakamura Chemical Co., Ltd.) which is polyethylene glycol monomethacrylate (average addition mole number of ethylene oxide=9, with a methyl group at a terminal).

(e) PP-800: BLEMMER PP-800 (trade name, manufactured by NOF Corporation) which is polypropylene glycol monomethacrylate (average addition mole number of propylene oxide=13, with a hydroxyl group at a terminal).

Production of Water-Insoluble Polymer 3: Polymer Production Example 3

Synthesis of Monomer (C)

16.6 g (0.112 mol) of 4-vinyl benzoic acid, 80 ml of toluene and two drops of N,N-dimethylformamide were placed into a 200-ml three-necked flask. While stirring this mixture at room temperature, 9.7 ml (0.14 mol) of thionyl chloride was added and stirred while heating at 60° C. for 2 hours. Thereafter, the system was cooled to around 40° C., and the toluene and excess thionyl chloride were removed under reduced pressure, thereby obtaining compound (B). Compound (B) was immediately used for the subsequent reaction without performing further purification.

To a 500-ml three-necked flask, 22.5 g (0.101 mol) of 2-aminoanthraquinone and 110 ml of pyridine were added, and compound (B) was slowly dropped therein using a dropping funnel while stirring under ice-cooling. After stirring for 30 minutes under ice-cooling, the mixture was heated and stirred at 60° C. for 3 hours. Thereafter, the reaction mixture was cooled to room temperature, and water was added while stirring. The crude crystal formed in the reaction mixture was separated by filtration, and was washed with running water and methanol. The collected crude crystal was placed in a 500-ml three-necked flask and 500 ml of methanol was added thereto, and this was heated and stirred at 60° C. Thereafter, the crystal was separated by filtration, washed with methanol and dried, thereby obtaining 21.5 g of monomer (C) (yield: 75%). The measurement results of NMR of monomer (C) are as follows.

$^1$H-NMR (300 MHz, CDCl$_3$) δ=5.48 (br.d, 1H, J=12.0 Hz), 6.07 (br.d, 1H, J=17.4 Hz), 6.89 (br.dd, 1H, J=12.0, 17.4 Hz), 7.78 (br.d, 2H, J=8.4 Hz), 7.94-8.05 (m, 4H), 8.08 (br.d, 2H, J=8.4 Hz), 8.19-8.24 (m, 1H), 8.29-8.34 (m, 1H), 9.19 (dd, 1H, J=1.5, 6.9 Hz), 13.1 (br.s, 1H).

(Production of Water-Insoluble Polymer 3)

To a 200-ml three-necked flask, 8.9 g (0.085 mol) of styrene, 5.0 g (0.014 mol) of monomer (C), 6.1 g (0.071 mol) of methacrylic acid and 45.7 g of N-methylpyrrolidone were added. While heating this mixture at an internal temperature of 80° C. under a nitrogen flow, a mixed solution of 0.39 g (1.7 mmol) of V-601 (trade name) and 0.5 g of N-methylpyrrolidone were added, and heated at 80° C. and stirred. The mixed solution of 0.39 g (1.7 mmol) of V-601 (trade name) and 0.5 g of N-methylpyrrolidone were added 3 times at an interval of 2 hours. After stirring for another 2 hours at 80° C., the mixture was cooled to room temperature. 600 ml of methanol and 600 ml of water were added to a 3 L stainless bucket, and the obtained mixture of styrene/monomer(C)/methacrylic acid copolymer was slowly dropped therein while stirring. The obtained powder was separated by filtration, thereby obtaining 10.5 g of water-insoluble polymer 3 (acid value: 185, mass average molecular weight: 50,000).

Production of Pigment Dispersion

Production of Pigment Dispersion A-1: Dispersion Production Example 1

The water-insoluble polymer solution obtained in the Polymer Production Example 1 was dried under reduced pressure to obtain a water-insoluble polymer 1. Then, 200 parts of the thus-obtained water-insoluble polymer 1 was dissolved in 400 parts of methyl ethyl ketone, and 16 parts of a neutralizing agent (5N sodium hydroxide aqueous solution) (neutralization degree: 60%) and 1,600 parts of ion-exchange water were added thereto to neutralize the salt-forming group of the polymer. Then, 645 parts of a copper phthalocyanine pigment (C. I. Pigment Blue 15:4; trade name: LIONOGEN BLUE LX-4033, manufactured by Toyo Ink MFG. Co., Ltd.) were added thereto, and mixed and dispersed using zirconia beads (particle diameter: 50 μm) in a bead mill disperser UAM05 (trade name, manufactured by Kotobuki Industries Co., Ltd.) at 20° C. for 2 hours. The obtained dispersion liquid was subjected to a dispersion treatment for 12-passes using a MICROFLUIDIZER (trade name, manufactured by Microfluidics International Corporation) at a pressure of 200 MPa.

To the thus-obtained dispersion liquid, 250 parts of ion-exchange water was added and stirred. Then, methyl ethyl ketone was removed therefrom at 60° C. under a reduced pressure, and a part of water was also removed, followed by filtration using a 0.2 μm-membrane filter to remove coarse particles, thereby obtaining a pigment dispersion A-1 having a pigment concentration of 20%.

Production of Pigment Dispersion A-2: Dispersion Production Example 2

The pigment dispersion A-1 obtained in the Dispersion Production Example 1 was subjected to centrifugation at 200,000 G for 3 hours. After the resultant supernatant was removed, the obtained precipitate was redispersed in 48 parts of ion-exchange water. The solution was subjected to filtration using a 0.2 μm-membrane filter to remove coarse particles, and the pigment concentration was adjusted to 18% with ion-exchange water, thereby obtaining a pigment dispersion A-2 of pigment-containing polymer particles.

The pigment concentration of the pigment dispersion A-2 redispersed in the ion-exchange water was determined by measuring the absorbency thereof using, as a reference, the absorbency of the pigment dispersion A-1 having a known concentration, containing the same pigment.

Production of Pigment Dispersion A-3: Dispersion Production Example 3

To 89 parts of the pigment dispersion A-2 obtained in the Dispersion Production Example 2, 0.11 parts of DENACOL EX-810 (trade name, manufactured by Nagase ChemteX Corporation; molecular weight: 216; epoxy equivalence: 113) as a crosslinking agent and 0.80 parts of ion-exchange water were added, and the mixture was stirred at 80° C. for 4 hours. Then, the obtained solution was adjusted with ion-exchange water to have a pigment concentration of 15%, thereby obtaining a pigment dispersion A-3. The amount of the crosslinking agent used was 3.3 parts with respect to 100 parts of the water-insoluble polymer. The weight average molecular weight of segments was 3,100, and the weight average molecular weight (Mw) of the crosslinked polymer was 280,000.

Production of Pigment Dispersion A-4: Dispersion Production Example 4

To 80 parts of the pigment dispersion A-1 obtained in the Dispersion Production Example 1, 0.11 parts of DENACOL EX-810 as a crosslinking agent and 0.80 parts of ion-exchange water were added, and the mixture was stirred at 80° C. for 4 hours. Then, the obtained solution was adjusted with ion-exchange water to have a pigment concentration of 15%, thereby obtaining a pigment dispersion A-4. The amount of the crosslinking agent used was 3.4 parts with respect to 100 parts of the water-insoluble polymer. The weight average molecular weight of a segment was 3,200, and the weight average molecular weight (Mw) of the crosslinked polymer was 290,000.

Production of Pigment Dispersion B-1: Dispersion Production Example 5

A pigment dispersion B-1 having a pigment concentration of 20% was obtained in the same manner as in the Dispersion Production Example 1, except that: the water-insoluble polymer used in the Dispersion Production Example 1 was changed to 200 parts of a water-insoluble polymer 2 which was obtained by drying the water-insoluble polymer solution obtained in the Polymer Production Example 2 under a reduced pressure; and the pigment used in the Dispersion Production Example 1 was changed to 571 parts by mass of a quinacridone pigment (C. I. Pigment Violet 19; trade name: INC JET MAGENTA E5B02, manufactured by Clariant).

Production of Pigment Dispersion B-2: Dispersion Production Example 6

The pigment dispersion B-1 obtained in the Dispersion Production Example 1 was subjected to centrifugation at 200,000 G for 3 hours. After the resultant supernatant was removed, the obtained precipitate was redispersed in 48 parts of ion-exchange water. The solution was subjected to filtration using a 0.2 μm-membrane filter to remove coarse particles, and the pigment concentration was adjusted to 18% with ion-exchange water, thereby obtaining a pigment dispersion B-2 of pigment-containing polymer particles.

The pigment concentration of the pigment dispersion B-2 redispersed in the ion-exchange water was determined by measuring the absorbency thereof using, as a reference, the absorbency of the pigment dispersion B-1 having a known concentration, containing the same pigment.

Production of Pigment dispersion B-3: Dispersion Production Example 7

To 89 parts of the pigment dispersion B-2 obtained in the Dispersion Production Example 6, 0.13 parts of DENACOL EX-810 as a crosslinking agent and 0.80 parts of ion-exchange water were added, and the mixture was stirred at 80° C. for 4 hours. Then, the obtained solution was adjusted with ion-exchange water to have a pigment concentration of 15%, thereby obtaining a pigment dispersion B-3. The amount of the crosslinking agent used was 3.9 parts with respect to 100 parts of the water-insoluble polymer.

Production of Pigment Dispersion B-4: Dispersion Production Example 8

To 80 parts of the pigment dispersion B-1 obtained in the Dispersion Production Example 5, 0.13 parts of DENACOL EX-810 as a crosslinking agent and 0.80 parts of ion-exchange water were added, and the mixture was stirred at 80° C. for 4 hours. Then, the obtained solution was adjusted with ion-exchange water to have a pigment concentration of 15%, thereby obtaining a pigment dispersion B-4. The amount of the crosslinking agent used was 4.0 parts with respect to 100 parts of the water-insoluble polymer.

Production of Pigment Dispersion C: Dispersion Production Example 9

13.2 parts of a unsubstituted quinacridone pigment (C. I. Pigment Violet 19; trade name: INC JET MAGENTA E5B-02, manufactured by Clariant), 6.6 parts of the water-insoluble polymer 2 obtained in the Polymer Production Example 2 (acid value: 185 mg KOH/g; Mw=50,000), 140 parts of dimethyl sulfoxide, and 40.6 parts of tetramethyl ammonium hydroxide (which may be abbreviated as "Me$_4$NOH", 25% methanol solution) as an alkali were mixed, and heated to 40° C. while stirring. A small amount of Me$_4$NOH was additionally added so that the pigment and the dispersant completely dissolve, and the mixture was stirred, thereby obtaining a deep bluish-purple pigment solution.

In a 5 L beaker, 2,000 g of ion-exchange water was added and ice-cooled. The above-described pigment solution was drawn into a TERUMO syringe (trade name: SS-50ESZ, manufactured by Terumo Corporation) equipped with a TERUMO needle (trade name: NN-1838R, diameter: 1.20 mm×length: 38 mm), and then ejected into the ion-exchange water while the ion-exchange water was stirred, thereby obtaining a pigment dispersion.

After being stirred for 30 minutes with ice-cooling, the pigment dispersion was transferred into a 2 L three-necked flask, and heated at an external temperature of 50° C. for 6 hours. After that, the pigment dispersion was cooled to room temperature. Then, dilute hydrochloric acid was added dropwise to the pigment dispersion to adjust the pH to 7.0, so that the pigment dispersion was allowed to aggregate to form pigment particles, thereby obtaining loose aggregates.

The obtained aggregates were filtrated under a reduced pressure using a membrane filter having an average pore size of 0.2 μm, and washed twice with ion-exchange water, thereby obtaining powdery product A of the pigment loose aggregates.

Then, 200 ml of acetone was added to the collected powdery product A of the pigment loose aggregates, and the mixture was stirred at room temperature for 1 hour. The mixture was then subjected to filtration under a reduced pressure using a membrane filter having an average pore size of 0.2 μm, and the obtained product was washed with ion-exchange water, thereby obtaining a powdery dispersion of the pigment particle, from which salt and solvent were removed.

Then, ion-exchange water was added to the powdery dispersion to attain a pigment content of 10%, and 1 mol/L sodium hydroxide aqueous solution was gradually added thereto. The mixture was subjected ultrasonic dispersion treatment using an ultrasonic homogenizer US-150T (trade name, manufactured by Nissei Corporation), thereby obtaining a pigment dispersion C having pH of 8.8.

The pigment dispersions obtained as described above were blended with other components in accordance with the ink formulations shown in Table 2, and subjected to filtration using a 0.2 μm-membrane filter, thereby obtaining respective inks Measurement of Amount of Free Polymer in Ink The ink sample for inkjet recording prepared above was subjected to centrifugation using a high-speed ultra centrifuge (trade name: OPTIMA XL100K, available from Beckman Coulter, Inc.) at 80,000 rpm for 1 hour so as to allow the water-insoluble polymer containing the pigment to precipitate, and the supernatant was collected. The amount of the water-insoluble polymer in the collected supernatant liquid was quantified by using a nuclear magnetic resonance analyzer (trade name: INOVA 400 ($^{13}$C-NMR), available from Varian Technologies Japan Limited). The standard curve was produced using a dispersant standard product at three points of density.

TABLE 2

| Ink formulation | A | B | C | D | E | F | G | H | I | J | K |
|---|---|---|---|---|---|---|---|---|---|---|---|
| Pigment dispersion | A-2 | A-2 | A-3 | A-3 | A-3 | A-3 | A-3 A-4 | B-2 | B-2 | B-3 | B-3 |
| (Solid content: mass part) | 28 | 28 | 33 | 33 | 33 | 33 | 20 13 | 20 | 20 | 20 | 20 |
| Glycerin | 8 | 8 | 8 | 8 | 8 | 8 | 8 | 8 | 8 | 10 | 8 |
| TEGmBE | 12 | 12 | 12 | 12 | 12 | 12 | 12 | 12 | 12 | 12 | 12 |
| Compound represented by formula (A): A (water-insoluble organic compound A) | 5 | | 5 | | | | 5 | 5 | | 5 | |
| Compound represented by formula (A): B (water-insoluble organic compound B) | | 5 | | 5 | | | | | | | 5 |
| Octylbenzyl phthalate | | | | | 5 | | | | 5 | | |
| Di-n-butyl sebacate | | | | | | 5 | | | | | |
| SURFINOL 465 | 1 | 1 | 1 | 1 | 1 | 1 | 1 | 1 | 1 | 1 | 1 |
| PROXEL XL2 | 0.3 | 0.3 | 0.3 | 0.3 | 0.3 | 0.3 | 0.3 | 0.3 | 0.3 | 0.3 | 0.3 |
| Ion-exchange water | Balance | Balance | Balance | Balance | Balance | Balance | Balance | Balance | Balance | Balance | Balance |

TABLE 2-continued

| | | | | | | | | | | |
|---|---|---|---|---|---|---|---|---|---|---|
| Free polymer amount (with respect total amount of ink) | 0.39 | 0.39 | 0.32 | 0.33 | 0.32 | 0.32 | 0.91 | 0.73 | 0.72 | 0.38 | 0.38 |
| Notes: | Present Invention | Present Invention | Present Invention | Present Invention | Present Invention | Present Invention | Present Invention | Present Invention | Present Invention | Present Invention | Present Invention |

| | Ink | | | | | | | | | |
|---|---|---|---|---|---|---|---|---|---|---|
| Ink formulation | L | M | N | O | P | Q | R | S | T | U |
| Pigment dispersion | C | C | A-2 | A-3 | A-3 A-4 | A-1 | A-4 | B-1 | B-4 | C |
| (Solid content: mass part) | 50 | 40 | 28 | 28 | 13 20 | 25 | 33 | 25 | 25 | 50 |
| Glycerin | 8 | 8 | 8 | 8 | 8 | 8 | 8 | 8 | 8 | 8 |
| TEGmBE | 12 | 12 | 12 | 12 | 12 | 12 | 12 | 12 | 12 | 12 |
| Compound represented by formula (A): A (water-insoluble organic compound A) | 5 | | | | 5 | | 5 | 5 | | |
| Compound represented by formula (A): B (water-insoluble organic compound B) | | 5 | | | | 5 | | | | |
| Octylbenzyl phthalate | | | | | | | | | 5 | |
| Di-n-butyl sebacate | | | | | | | | | | |
| SURFINOL 465 | 1 | 1 | 1 | 1 | 1 | 1 | 1 | 1 | 1 | 1 |
| PROXEL XL2 | 0.3 | 0.3 | 0.3 | 0.3 | 0.3 | 0.3 | 0.3 | 0.3 | 0.3 | 0.3 |
| Ion-exchange water | Balance | Balance | Balance | Balance | Balance | Balance | Balance | Balance | Balance | Balance |
| Free polymer amount (with respect total amount of ink) | 0.1 or less | 0.1 or less | 0.38 | 0.31 | 1.1 | 1.28 | 1.05 | 1.43 | 1.2 | 0.1 or less |
| Notes: | Present Invention | Present Invention | Comparative Example | Comparative Example | Comparative Example | Comparative Example | Comparative Example | Comparative Example | Comparative Example | Comparative Example |

Octylbenzyl phthalate (Log P = 6.79)
Di-n-butyl sebacate (Log P = 6.30)

Evaluation of Foaming Property and Defoaming Property 10 g of the respective inks described in Table 2 were placed in a cylindrical glass container having a size of 2 cm in diameter×10 cm in height, which was sealed and shaken 50 times. The foaming property was evaluated by measuring the height from the interface of the foam and the liquid to the highest point of the foam (H), and the defoaming property was evaluated by measuring the time in which the height from the interface of the foam and the liquid to the highest point of the foam (H) was 0.5H. The experiment was carried out at a temperature of 23 to 24° C. The results are shown in Table 3.

Inkjet Image Recording

Evaluation of printed image using the respective inks described in Table 2 was carried out by using a printer for evaluation equipped with a line head piezo recording head (nozzle diameter: 20 μm, driving frequency: 30 kHz, ink jetting amount: 3.8 pl, number of nozzles: 512 (number of nozzles per color: 128), at a recording resolution of 1440×1440 dpi (in the invention, dpi refers to the number of dots per 2.54 cm). A4 size paper sheets (trade name: SHIRAOI, available from Nippon Paper Industries Co., Ltd., 64 g/m$^2$) were used as the recording medium, and a solid image was printed.

Evaluation of Ink Adhesion to Head (Adhesion Evaluation)

1 μL of the respective inks were dropped on a head nozzle member that had been subjected to a water repellent treatment by implanting Ar ions in its PTFE surface, and the ink was dried for 30 minutes at room temperature. Thereafter, 10 μL of the same respective inks were dropped on the dried ink. 10 seconds after the dropping, the ink droplets on the head nozzle member were wiped off once in one direction by applying load of 200 g, and the ink adhering to the head nozzle member was visually observed. When adhesion of the ink was observed, the operation of dropping 10 μL of the ink on the died ink, waiting for 10 seconds, and wiping off the ink droplets from the head nozzle member once in one direction by applying load of 200 g, was repeated. The evaluation of ink adhesion was carried out in accordance with the following criteria. The results are shown in Table 3.

Evaluation Criteria

3: Adhered ink was removed by carrying out the operation once.

2: Adhered ink was removed by carrying out the operation twice.

1: Adhered ink was observed even after carrying out the operation three times.

Evaluation of Jetting Stability

Using the printer for evaluation, 2,000 images each having 10 wedge charts of 1 cm×10 cm with spaces therebetween were printed on A4-size recording media in a consecutive manner in an environment of 23° C. and 20% RH. The 10th image and the 2,000th image were compared with each other by visual observation, and jetting stability was evaluated in accordance with the following evaluation criteria. The results are shown in Table 3.

Evaluation Criteria

3: printing misdirection or streaks (print defects due to non-ejection) were observed in neither the 10th nor the 2,000th image.

2: printing misdirection was observed in the 2,000th image.

1: printing misdirection and streaks were observed in the 2,000th image.

Evaluation of Jetting Recovery

Using the printer for evaluation, 9 images each having 10 wedge charts of 1 cm×10 cm with spaces therebetween were printed on A4-size recording media in a consecutive manner in an environment of 23° C. and 20% RH. After stopping the printing for 10 minutes, the 10th image was printed. The state of jetting of nozzles and the image at the time of printing the 10th image were visually observed, and the ability of recovery in jetting was evaluated in accordance with the following evaluation criteria. The results are shown in Table 3.

Evaluation Criteria

3: No changes in the state of jetting were observed in any nozzles, and the occurrence of streaks in the image (print defects due to non-ejection) was observed in no more than 2% of the number of nozzles.

2: Occurrence of streaks was observed in from 3% to less than 10% of the number of nozzles.

1: Occurrence of streaks was observed in not less than 10% of the number of nozzles.

Evaluation of Removability

Using the printer for evaluation, 2,000 images each having 10 wedge charts of 1 cm×10 cm with spaces therebetween were printed on A4-size recording media in a consecutive manner in an environment of 23° C. and 20% RH. Thereafter, a 20% diethylene glycol aqueous solution with a pH adjusted to 8.2 with sodium hydrogen carbonate was applied to a nozzle surface, and a wiping operation (cleaning operation) was carried out once using a rubber blade. After the wiping, 20 images each having 10 wedge charts of 1 cm×10 cm with spaces therebetween were printed on A4-size recording media in a consecutive manner in an environment of 23° C. and 20% RH, and the ability of recovery of jetting was confirmed by visually observing the obtained images. Subsequently, the line head was detached from the printer, and the removability was evaluated by observing the jetting surface of the head in accordance with the following evaluation criteria. The results are shown in Table 3.

Evaluation Criteria

3: No ink residue was observed on the jetting surface of the head, and the jetting was stable.

2: Ink residue was not observed on the jetting surface of the head, but dropping of the ink occurred in the printed images.

1: Ink residue was observed on the jetting surface of the head, and dropping of the ink occurred in large numbers in the printed images.

Evaluation of Dispersion Stability 50 ml of the ink shown in Table 2 was put in a sealed sample vessel so that the ink did not evaporate. The sample vessel was left standing in a thermostatic chamber at 60° C. for 3 weeks. The volume average particle diameters (Mv) before and after the storage were determined by dynamic light scattering using a Microtrac particle size distribution analyzer (trade name: Version 10.1.2-211BH, manufactured by Nikkiso Co., Ltd.), and the rate of change therebetween was obtained. On the basis thereof, dispersion stability was evaluated, and the results are shown in Table 3.

Evaluation Criteria

4: Rate of change was less than 5%.

3: Rate of change was from 5% to less than 10%.

2: Rate of change was from 10% to 30%

1: Rate of change exceeded 30%, which is a practically intolerable level.

Evaluation of Accuracy of Jetting Point after Storage at High Temperature Preparation of Colorless Ink Composition A colorless ink was prepared by mixing the following materials.

Colorless Ink Composition

| Citric acid | 15 g |
| OLFINE E1010 (trade name, manufactured by Nisshin Chemical Industry Co., Ltd.) | 1 g |
| Ion-exchange water | 84 g |

Evaluation of Accuracy of Jetting Point after Storage at High Temperature

An inkjet recording apparatus equipped with a printing head (head: 1,200 dpi/20 inch-width full-line head; jetting liquid amounts: 0 pL, 2.0 pL, 3.5 pL, 4.0 pL, 4 value recording; driving wavelength: 30 kHz; recoding medium conveyance speed: 635 mm/sec) was prepared such that liquid can be supplied from the outside.

The respective inks shown in Table 2, which were obtained as described above, were supplied to the apparatus, and the colorless ink composition prepared as described above and the respective inks were jetted in this order from separate jetting nozzles onto a high-quality paper sheet (trade name: SHIRAOI, 76.5 g/m$^2$, manufactured by Nippon Paper Group, Inc.), thereby forming a 1-dot line.

In the printing, the inks for inkjet printing stored stationarily at 60° C. for 3 weeks after production were used.

After the jetted inks were dried, the paper sheet was fixed-heated at 100° C. for 10 seconds, thereby fixing the formed image. The linearity of the formed dot line was visually evaluated (sensory evaluation) in accordance with the following evaluation criteria. In the evaluation criteria, the number "1" denotes a condition in which the dot line is significantly curved, and the degree of typical curve was measured; as a result, it was found that the jetted ink droplets in the curved dot line are misaligned 7 μm from the position at a maximum from which the jetted ink droplets should have jetted. The results are shown in Table 3; however, cases where evaluation was not performed because the inks were not jetted or ink jetting was stopped during the printing, is denoted by "-" in Table 3.

Evaluation Criteria

5: No curved dot line was observed.

4: Slight curve was observed.

3: Curved dot line was observed, but it was in a practically tolerable range.

2: Largely curved dot line was observed, indicating a practically intolerable range.

1: Significantly curved dot line was observed.

TABLE 3

| | Ink | | | | | | | | | | | |
|---|---|---|---|---|---|---|---|---|---|---|---|---|
| | A | B | C | D | E | F | G | H | I | J | K | L |
| Foaming property (cm) | 7 | 7 | 6 | 6 | 6 | 7 | 9 | 7 | 8 | 6 | 6 | 5 |
| Defoaming property (min) | 3 | 4 | 3 | 3 | 4 | 4 | 9 | 7 | 7 | 4 | 4 | 3 |
| Adhesion to printer member | 3 | 3 | 3 | 3 | 3 | 3 | 3 | 3 | 3 | 3 | 3 | 3 |
| Jetting stability | 3 | 3 | 3 | 3 | 3 | 3 | 2 | 3 | 3 | 3 | 3 | 3 |
| Jetting recoverability | 3 | 3 | 3 | 3 | 3 | 3 | 2 | 2 | 2 | 3 | 3 | 3 |
| Ink removability | 3 | 3 | 3 | 3 | 3 | 3 | 3 | 3 | 3 | 3 | 3 | 3 |
| Dispersion stability | 3 | 3 | 4 | 4 | 4 | 4 | 3 | 3 | 3 | 4 | 4 | 4 |
| Accuracy of jetting position after Storage at High Temperature | 4 | 4 | 5 | 5 | 5 | 5 | 3 | 4 | 4 | 4 | 4 | 5 |
| Notes: | Present Invention | Present Invention | Present Invention | Present Invention | Present Invention | Present Invention | Present Invention | Present Invention | Present Invention | Present Invention | Present Invention | Present Invention |

| | Ink | | | | | | | | |
|---|---|---|---|---|---|---|---|---|---|
| | M | N | O | P | Q | R | S | T | U |
| Foaming property (cm) | 5 | 8 | 7 | 7 | 9 | 7 | 9 | 8 | 7 |
| Defoaming property (min) | 3 | 13 | 13 | 20 | 20 | 18 | 23 | 20 | 10 |
| Adhesion to printer member | 3 | 1 | 1 | 1 | 1 | 2 | 1 | 2 | 1 |
| Jetting stability | 3 | 1 | 1 | 2 | 1 | 1 | 1 | 1 | 1 |
| Jetting recoverability | 3 | 1 | 1 | 1 | 1 | 1 | 1 | 1 | 1 |
| Ink removability | 3 | 1 | 1 | 2 | 1 | 2 | 1 | 2 | 1 |
| Dispersion stability | 4 | 3 | 4 | 1 | 1 | 2 | 1 | 1 | 4 |
| Accuracy of jetting position after Storage at High Temperature | 5 | 1 | 1 | — | — | 2 | — | — | 1 |
| Notes: | Present Invention | Comparative Example | Comparative Example | Comparative Example | Comparative Example | Comparative Example | Comparative Example | Comparative Example | Comparative Example |

As is clear from Table 3, the ink compositions of the invention exerted excellent jetting stability and ink removability.

According to the invention, an ink composition having excellent jetting stability and ink removability, an ink set including the ink composition, and a method of forming an image, in which the ink composition is used, are provided.

Embodiments of the present invention include, but are not limited to, the following.

<1> An ink composition, comprising:
water-insoluble polymer particles comprising a colorant and a water-insoluble polymer; and
a compound represented by the following Formula (A),
wherein the content of free polymer derived from the water-insoluble polymer is 1.0% by mass or less with respect to the total mass of the ink composition:

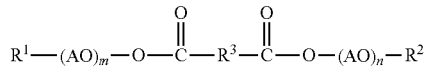

formula (A)

wherein, $R^1$ and $R^2$ each independently represent a hydrogen atom or a hydrocarbon group having 1 to 22 carbon atoms; $R^3$ represents a divalent hydrocarbon group having 1 to 18 carbon atoms; $R^1$ and $R^2$ may be the same as or different from each other, but $R^1$ and $R^2$ do not both represent a hydrogen atom at the same time; $R^1$ to $R^3$ may each have a substituent; m and n each independently represent an average addition mole number of AO of from 0 to 30; and AO represents an alkylene oxy group.

<2> The ink composition according to <1>, wherein the water-insoluble polymer comprises:
a structural unit derived from a monomer having a salt-forming group (a); and
at least one of a structural unit derived from a styrenic macromer (b) or a structural unit derived from a hydrophobic monomer (c).

<3> The ink composition according to <1> or <2>, wherein the water-insoluble polymer particles comprise polymer particles formed by:
mixing a crosslinking agent and a water-insoluble polymer, wherein the water-insoluble polymer comprises a structural unit derived from a monomer having a salt-forming group (a), and at least one of a structural unit derived from a styrenic macromer (b) or a hydrophobic monomer (c); and
crosslinking the water-insoluble polymer.

<4> The ink composition according to <2> or <3>, wherein the monomer having a salt-forming group (a) has a carboxyl group, a sulfonic acid group, a phosphoric acid group, an amino group or an ammonium group.

<5> The ink composition according to <2> or <3>, wherein the styrenic macromer (b) is a monomer having a number average molecular weight of from 500 to 100,000 and has an unsaturated group at one terminal thereof.

<6> The ink composition according to <2> or <3>, wherein the hydrophobic monomer (c) is alkyl (meth)acrylate, alkyl (meth)acrylamide, or an aromatic ring-containing monomer.

<7> The ink composition according to <2> or <3>, wherein the structural unit derived from the hydrophobic monomer (c) is represented by the following formula (1) or (2):

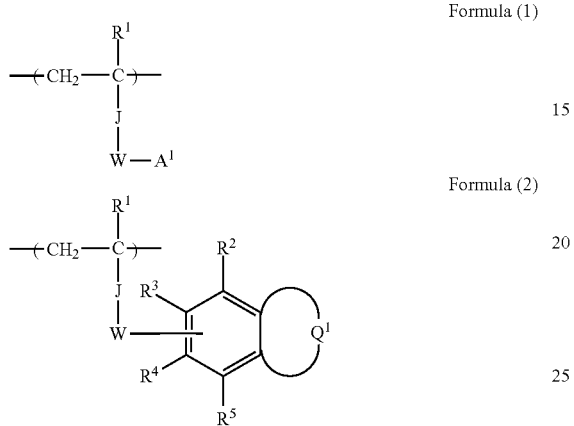

wherein in Formula (1) and Formula (2), $R^1$ represents a hydrogen atom or a substituent; One of $R^2$ to $R^5$ represents a single bond to W, and the others each independently represent a hydrogen atom or a substituent; J represents *—CO—, *—COO—, *—CONR$^{10}$—, *—OCO—, a methylene group, a phenylene group or *—C$_6$H$_4$CO—; $R^{10}$ represents a hydrogen atom, an alkyl group, an aryl group or an aralkyl group; W represents a single bond or a divalent linking group; $A^1$ represents a hetero ring group; $Q^1$ represents a group of atoms that is necessary for forming a ring together with the carbon atoms; and *— represents a bonding to the main chain.

<8>. An ink set comprising the ink composition according to any one of <1> to <7>.

<9>. An image formation method comprising forming an image by jetting the ink composition according to any one of <1> to <7> from plural jetting ports that are arranged in a two-dimensional matrix.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink composition, comprising:
water-insoluble polymer particles comprising a colorant and a water-insoluble polymer, wherein the water-insoluble polymer comprises:
a structural unit derived from a monomer having a salt-forming group (a), and
at least one of a structural unit derived from a styrenic macromer (b) or a structural unit derived from a hydrophobic monomer (c),
wherein the structural unit derived from the hydrophobic monomer (c) is represented by the following Formula (1) or Formula (2):

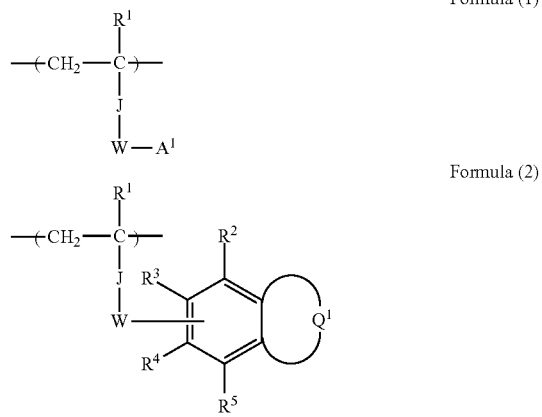

wherein, in Formula (1), W represents an imino group, a straight-chain, branched or cyclic alkylene group, an aralkylene group, an arylene group, *-(CR$^{11}$R$^{12}$)$_n$NHCONH—, *—(CR$^{11}$R$^{12}$)$_n$CONH— or any combination thereof, each of which may have a substituent, or a single bond; *— represents a bonding position to the main chain; and $R^{11}$ and $R^{12}$ each independently represent a hydrogen atom or a substituent;

wherein, in Formula (2), W represents a single bond or a divalent linking group, and wherein, in Formula (1) and Formula (2), $R^1$ represents a hydrogen atom or a substituent; one of $R^2$ to $R^5$ represents a single bond to W, and the others each independently represent a hydrogen atom or a substituent; J represents *—CO—, *—COO—, *—CONR$^{10}$—, *—OCO—, a methylene group, a phenylene group or *—C$_6$H$_4$CO—; $R^{10}$ represents a hydrogen atom, an alkyl group, an aryl group or an aralkyl group; $A^1$ represents a hetero ring group; $Q^1$ represents a group of atoms that is necessary for forming a ring together with the carbon atoms; and *— represents a bonding position to the main chain; and a compound represented by the following formula (A), wherein the content of free polymer derived from the water-insoluble polymer is 1.0% by mass or less with respect to the total mass of the ink composition:

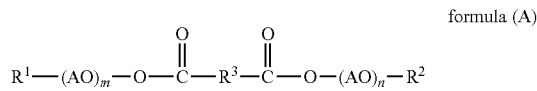

wherein, in formula (A), $R^1$ and $R^2$ each independently represent a hydrogen atom or a hydrocarbon group having 1 to 22 carbon atoms; $R^3$ represents a divalent hydrocarbon group having 1 to 18 carbon atoms; $R^1$ and $R^2$ may be the same as or different from each other, but $R^1$ and $R^2$ do not both represent a hydrogen atom at the same time; $R^1$ to $R^3$ may each have a substituent; m and n each independently represent an average addition mole number of AO of from 0 to 30; and AO represents an alkylene oxy group.

2. The ink composition according to claim 1, wherein the water-insoluble polymer particles comprise polymer particles formed by:

mixing a crosslinking agent and a water-insoluble polymer, wherein the water-insoluble polymer comprises a structural unit derived from a monomer having a salt-forming group (a), and at least one of a structural unit derived from a styrenic macromer (b) or a hydrophobic monomer (c); and crosslinking the water-insoluble polymer.

3. The ink composition according to claim 1, wherein the monomer having a salt-forming group (a) has a carboxyl group, a sulfonic acid group, a phosphoric acid group, an amino group or an ammonium group.

4. The ink composition according to claim 1, wherein the styrenic macromer (b) is a monomer having a number average molecular weight of from 500 to 100,000 and has an unsaturated group at one terminal thereof.

5. The ink composition according to claim 1, wherein the hydrophobic monomer (c) is alkyl (meth)acrylate, alkyl (meth)acrylamide, or an aromatic ring-containing monomer.

6. An ink set comprising the ink composition according to claim 1.

7. An image formation method comprising forming an image by jetting the ink composition according to claim 1 from plural jetting ports that are arranged in a two-dimensional matrix.

8. A method of producing the ink composition according to claim 1, the method comprising:

dispersing a mixture containing a water-insoluble polymer, an organic solvent, a colorant and water;

removing the organic solvent, thereby obtaining a colorant aqueous dispersion of water-insoluble polymer particles containing the colorant;

subjecting the colorant aqueous dispersion to centrifugal separation, thereby obtaining a precipitant; and redispersing the precipitant in an aqueous medium.

* * * * *